(12) United States Patent
Edwards et al.

(10) Patent No.: US 11,085,564 B2
(45) Date of Patent: Aug. 10, 2021

(54) SEALING RINGS AND SEALING RING ASSEMBLIES FOR HIGH TEMPERATURE END APPLICATIONS

(71) Applicant: Greene, Tweed Technologies, Inc., Wilmington, DE (US)

(72) Inventors: Timothy J. Edwards, Schwenksville, PA (US); Joshua S. Kehler, York, PA (US); Justin V. Jones, Philadelphia, PA (US); Kevin F. Tsang, Philadelphia, PA (US)

(73) Assignee: Greene, Tweed Technologies, Inc., Wilmington, DE (US)

( * ) Notice: Subject to any disclaimer, the term of this patent is extended or adjusted under 35 U.S.C. 154(b) by 0 days.

(21) Appl. No.: 15/348,552

(22) Filed: Nov. 10, 2016

(65) Prior Publication Data

US 2017/0130881 A1    May 11, 2017

Related U.S. Application Data

(60) Provisional application No. 62/254,119, filed on Nov. 11, 2015.

(51) Int. Cl.
*F16L 3/20* (2006.01)
*F16L 23/20* (2006.01)
(Continued)

(52) U.S. Cl.
CPC ............... *F16L 23/20* (2013.01); *F16L 23/04* (2013.01); *F16L 23/18* (2013.01); *F16L 23/22* (2013.01)

(58) Field of Classification Search
CPC .. F16J 15/02; F16J 15/06; F16J 15/061; F16J 15/064; F16J 15/12; F16J 15/121;
(Continued)

(56) References Cited

U.S. PATENT DOCUMENTS 3,167,322 A * 1/1965 Aichroth ............... F16J 15/127
                                                          277/453
3,279,805 A * 10/1966 Quinson ............... F16J 15/127
                                                          277/611
(Continued)

FOREIGN PATENT DOCUMENTS

EP      1 096 183 A2    5/2001
GB       701 614 A     12/1953
(Continued)

OTHER PUBLICATIONS

International Search Report from Counterpart PCT Application No. PCT/US2016/061342 (13 pages) dated Dec. 29, 2016.
(Continued)

*Primary Examiner* — Gilbert Y Lee
(74) *Attorney, Agent, or Firm* — Calderone Bullock LLC

(57) ABSTRACT

Sealing assemblies are described herein useful for high temperature applications, as well as applications involving aggressive chemical reactants, byproducts and/or reaction environments. The assemblies include an outer ring having an interior surface having two inwardly extending projections defining a seal receiving area, an inner ring having an exterior surface having two outwardly extending projections defining a seal receiving area; and a center sealing ring configured to be positioned within the seal receiving areas of the outer ring and the inner ring. When the sealing assembly is installed in a high temperature application, the elastomeric center sealing ring is enclosed within the outer and the inner rings so as to protect the center sealing ring while allowing for thermal expansion of the center sealing ring. In further embodiments, bonded sealing ring bodies are disclosed as well.

40 Claims, 17 Drawing Sheets

(51) Int. Cl.
*F16L 23/04* (2006.01)
*F16L 23/22* (2006.01)
*F16L 23/18* (2006.01)

(58) Field of Classification Search
CPC ........ F16J 15/125; F16J 15/127; F16J 15/128; F16L 23/16; F16L 23/18; F16L 23/20; F16L 23/22
See application file for complete search history.

(56) References Cited

U.S. PATENT DOCUMENTS

| | | | | |
|---|---|---|---|---|
| 3,467,398 | A | * | 9/1969 | Bernard ............... F16J 15/0881 277/639 |
| 3,704,021 | A | * | 11/1972 | Barbarin ................ F16J 15/104 277/611 |
| 4,002,344 | A | * | 1/1977 | Smith .................... F16J 15/061 277/609 |
| 4,095,809 | A | * | 6/1978 | Smith .................... F16J 15/061 277/609 |
| 4,604,800 | A | | 8/1986 | Yamamoto et al. |
| 4,776,600 | A | * | 10/1988 | Kohn .................... F16L 25/026 277/611 |
| 5,597,166 | A | * | 1/1997 | Grytz ................... F02M 51/005 277/644 |
| 5,722,668 | A | | 3/1998 | Rice et al. |
| 6,010,133 | A | | 1/2000 | Boyd et al. |
| 6,286,839 | B1 | | 9/2001 | Mitsui et al. |
| 6,325,390 | B1 | | 12/2001 | Sillmon |
| 6,357,759 | B1 | | 3/2002 | Azuma et al. |
| 6,708,984 | B1 | | 3/2004 | North et al. |
| 6,811,157 | B2 | | 11/2004 | Shinoda et al. |
| 6,869,081 | B1 | * | 3/2005 | Jenco .................... F16L 23/003 277/611 |
| 6,932,354 | B2 | | 8/2005 | Kane et al. |
| 7,159,906 | B1 | | 1/2007 | Vaudreuil et al. |
| 7,520,511 | B2 | * | 4/2009 | Mori ..................... F16J 15/062 277/611 |
| 7,722,053 | B2 | | 5/2010 | Hanashima et al. |
| 7,866,669 | B2 | | 1/2011 | Kobayashi et al. |
| 7,914,053 | B2 | * | 3/2011 | Keller .................. F16L 23/036 285/364 |
| 8,141,848 | B2 | * | 3/2012 | Elston .................. F16K 11/0712 137/625.48 |
| 8,191,933 | B2 | * | 6/2012 | Rao ..................... F16J 15/104 277/608 |
| 8,500,953 | B2 | | 8/2013 | Chang et al. |
| 8,727,311 | B2 | | 5/2014 | Ehrne |
| 8,888,106 | B2 | * | 11/2014 | Hamade ............... F16J 15/104 277/626 |
| 2007/0001403 | A1 | | 1/2007 | Hanashima et al. |
| 2007/0001404 | A1 | | 1/2007 | Mori et al. |
| 2007/0273102 | A1 | | 11/2007 | Schroeder et al. |
| 2008/0029972 | A1 | | 2/2008 | Smathers et al. |
| 2009/0160137 | A1 | | 6/2009 | Smathers et al. |
| 2009/0295155 | A1 | | 12/2009 | Keller-Staub et al. |
| 2010/0232999 | A1 | | 9/2010 | Okoroafor |
| 2010/0239448 | A1 | | 9/2010 | Okoroafor |
| 2011/0169229 | A1 | | 7/2011 | Hamade et al. |
| 2012/0299252 | A1 | | 11/2012 | Singh |
| 2016/0245434 | A1 | | 8/2016 | Seeley |

FOREIGN PATENT DOCUMENTS

| | | |
|---|---|---|
| JP | 55-004463 U | 1/1980 |
| JP | 60-008573 A | 1/1985 |
| JP | 2001-124210 A | 5/2001 |
| JP | 2007-10100 A | 1/2007 |
| JP | 2007173420 A | 7/2007 |
| JP | 04-668703 B2 | 4/2011 |
| JP | 04-668704 B2 | 4/2011 |
| JP | 05073932 B2 | 11/2012 |
| JP | 2014-152929 A | 8/2014 |
| KR | 2014-073081 A | 6/2014 |
| KR | 10-1471772 B1 | 12/2014 |
| TW | 200716899 A | 5/2007 |
| TW | 201533364 A | 9/2015 |
| WO | WO 2017/083524 A1 | 5/2017 |

OTHER PUBLICATIONS

European Search report in counterpart Application No. 16865004.2, 17 pages (dated Jun. 26, 2019).
Examination Report from Taiwan Counterpart 105136848 and Translation, dated Nov. 22, 2019 (43 pages).
Response Filed to Examination Report from Taiwan Counterpart Appln. No. 105136848 with English Claims, dated May 25, 2020 (44 pages).
Response to Extended European Search Report in EP Counterpart Appln. No. 168650004.2, 7 pages (dated Jan. 21, 2020).
European Office Action in European Counterpart Appln. No. 168650004.2, 16 pages, dated May 15, 2020.
Singapore First Search Report and Written Opinion in Singapore Counterpart Appln. No. 11201803589Q, 11 pages (dated Sep. 23, 2019).
Response to First Singapore Search Report and Written Opinion in Singapore Counterpart Appln. No. 11201803489Q, 58 pages (dated Apr. 14, 2020).
Singapore Second Written Opinion in Singapore Counterpart Appln. No. 11201803589Q, 5 pages (dated Jun. 19, 2020).
Third Party Observation in Japanese Counterpart 2018-520405, 24 pages, Aug. 26, 2020.
Response to European Search Report in European Counterpart 168650004.2, 26 pages, dated Nov. 25, 2020.
Official Action in Japanese Counterpart 2018-520405, 19 pages, dated Dec. 31, 2020.
Response to Singapore Second Written Opinion in Singapore Counterpart Appln. 11201803589Q, 35 pages, dated Dec. 18, 2020.
Office Action and English Translation in Taiwan Counterpart 105136848, dated Oct. 30, 2020, 21 pages.

* cited by examiner

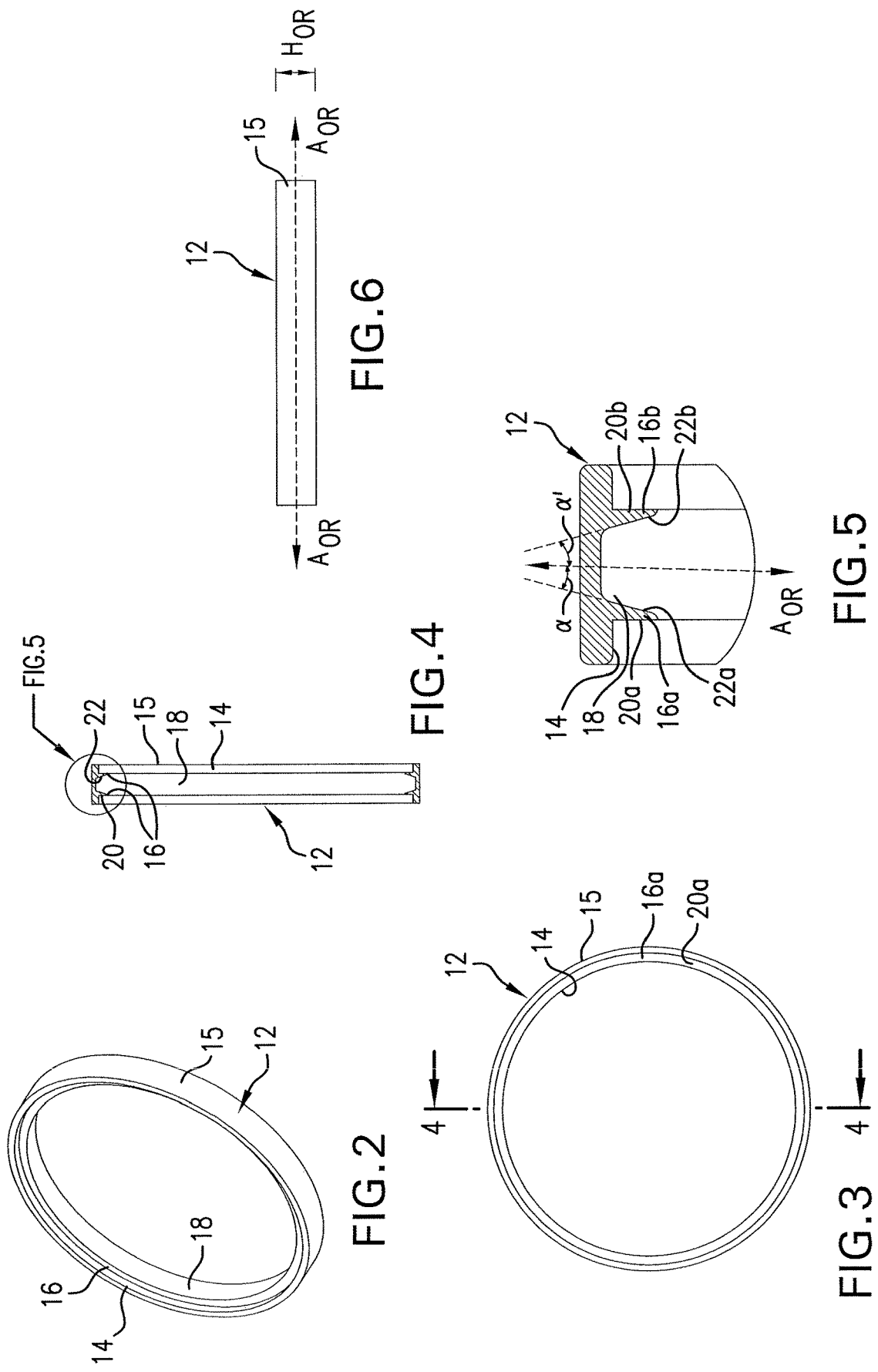

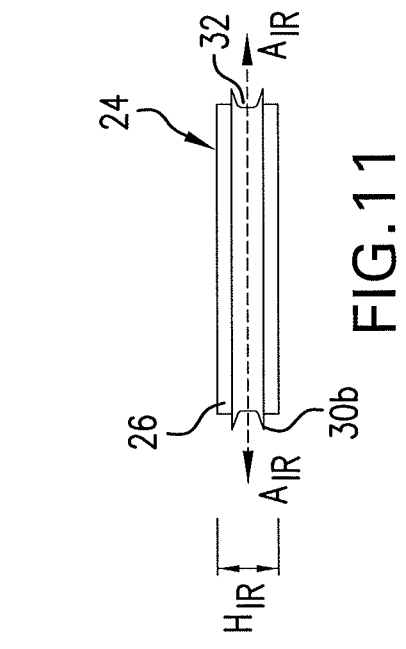
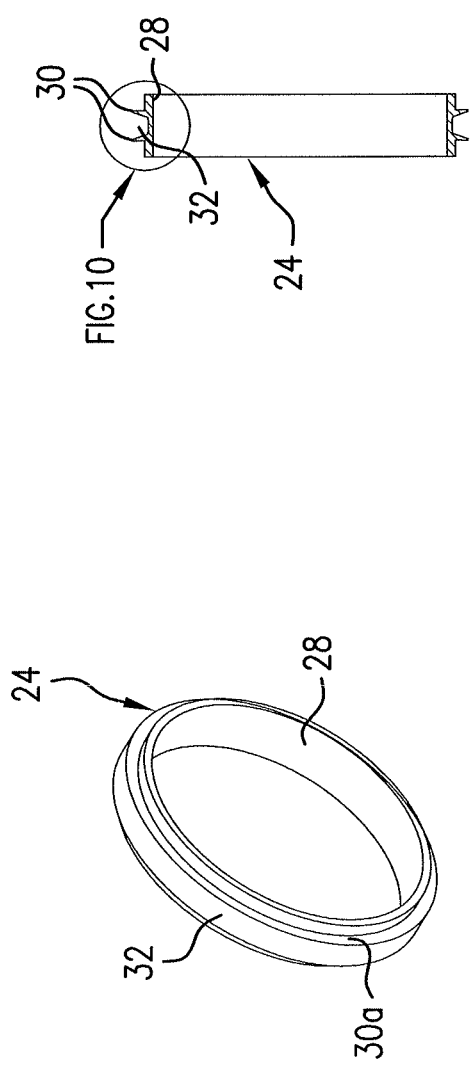
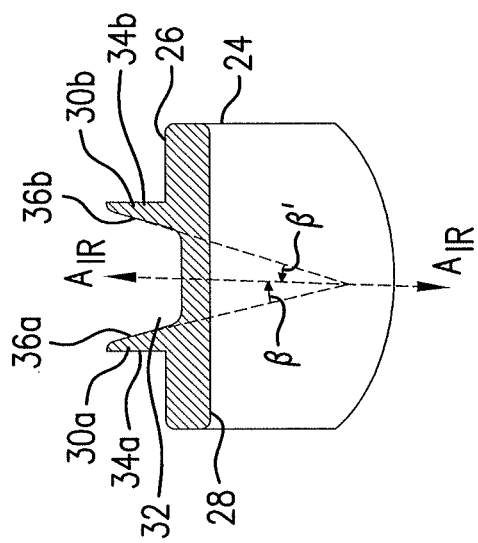
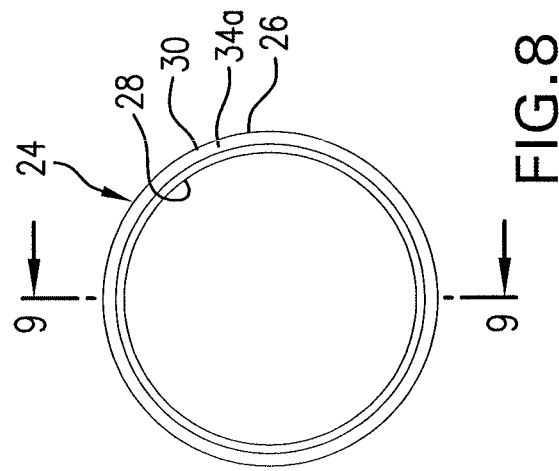
FIG. 11
FIG. 9
FIG. 10
FIG. 7
FIG. 8

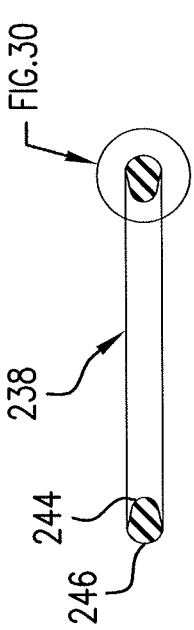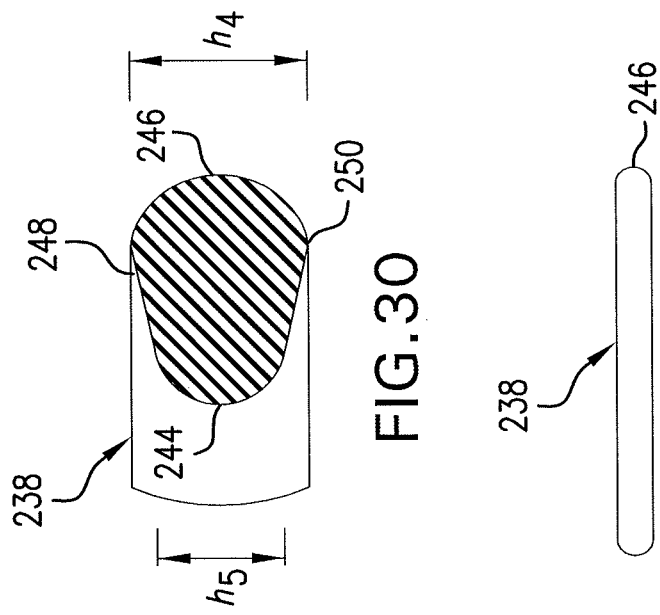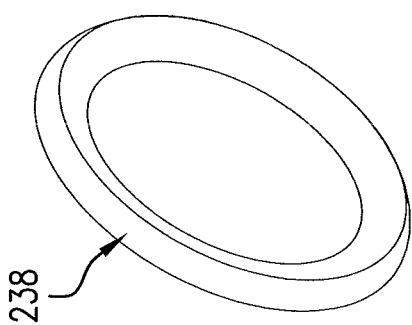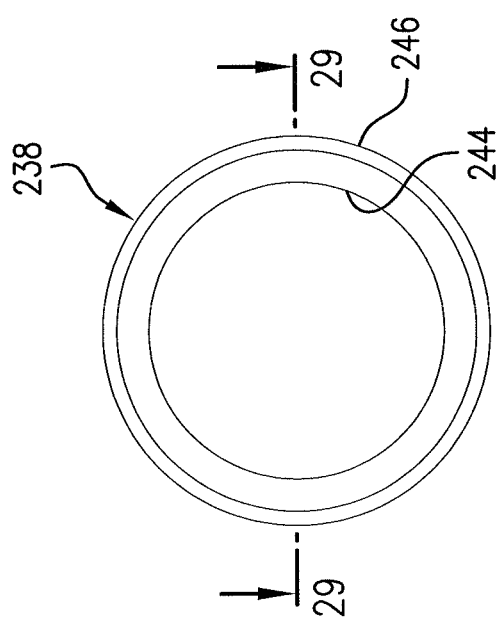

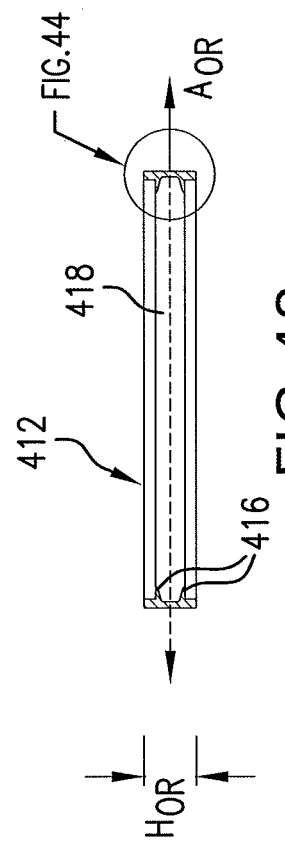
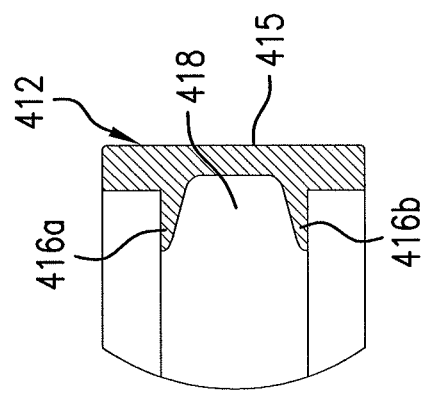
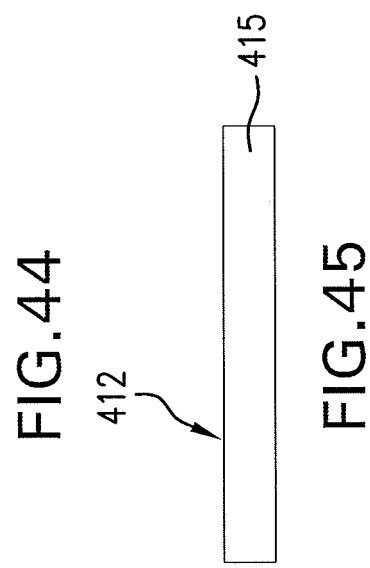
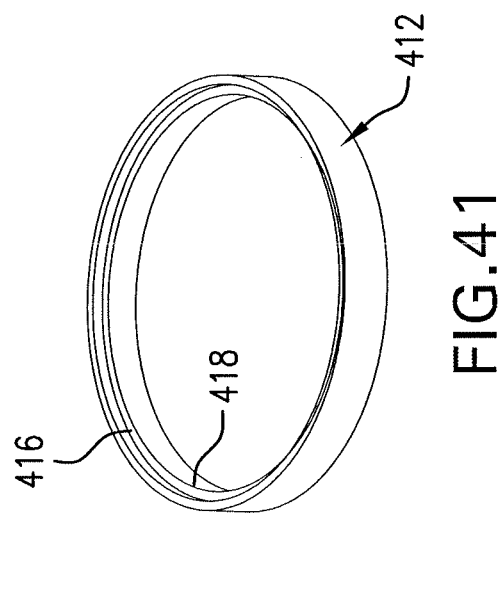
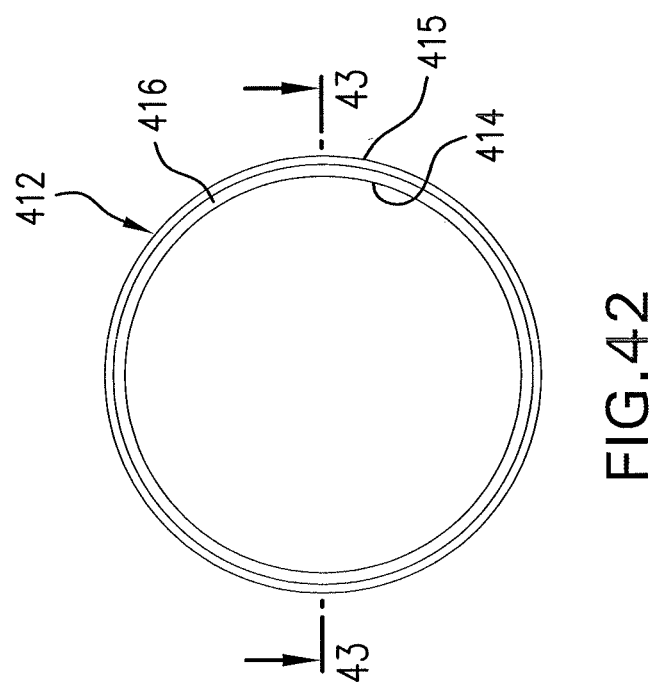

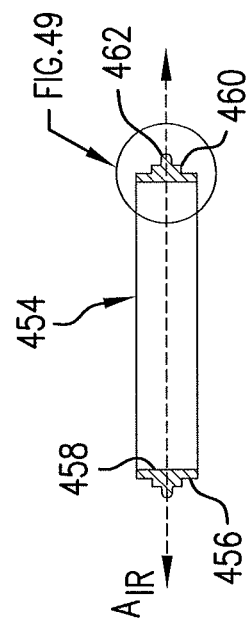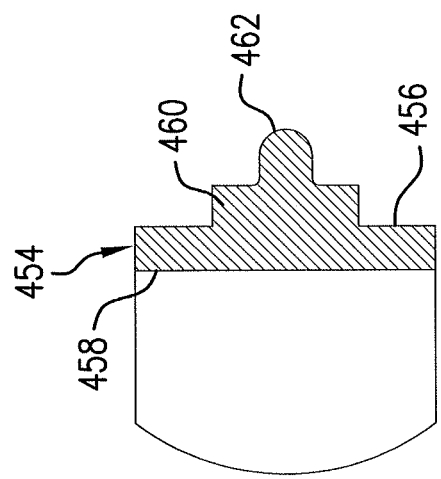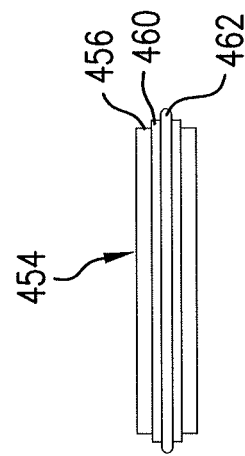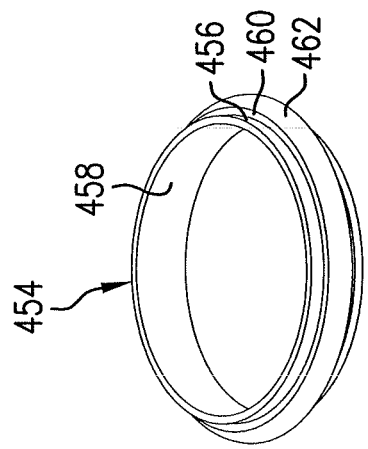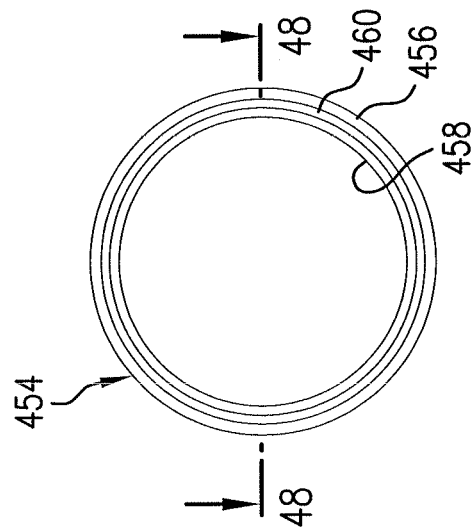

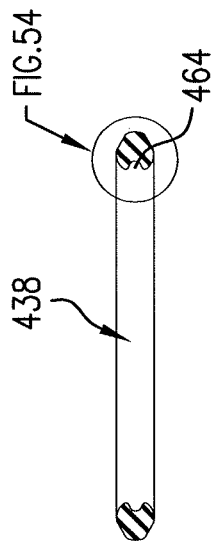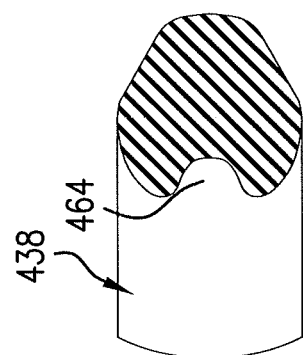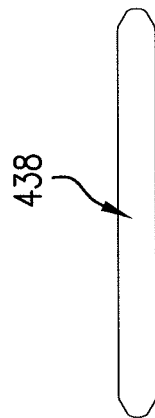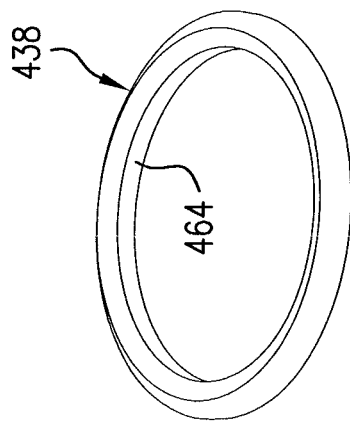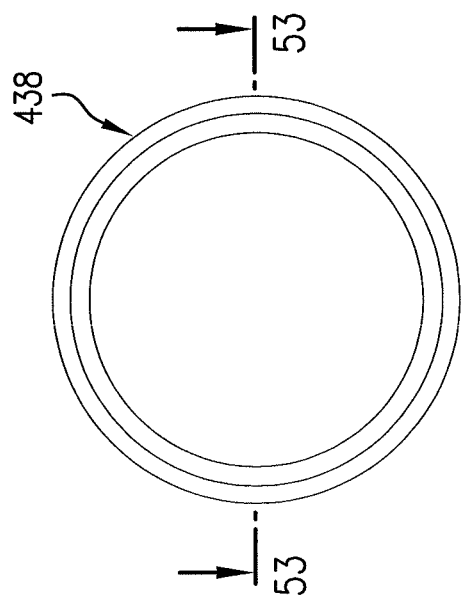

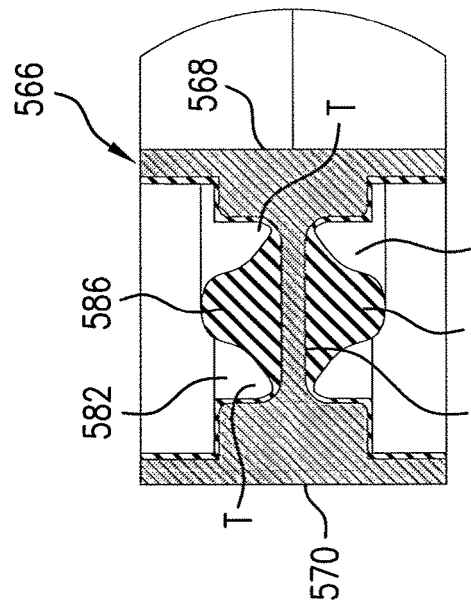
FIG.60
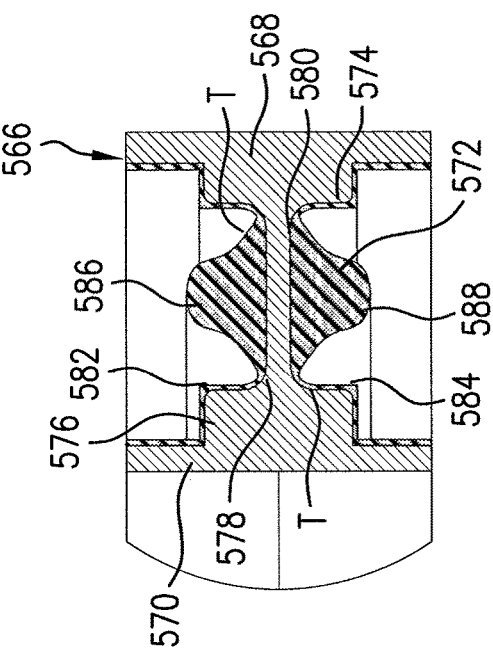
FIG.61
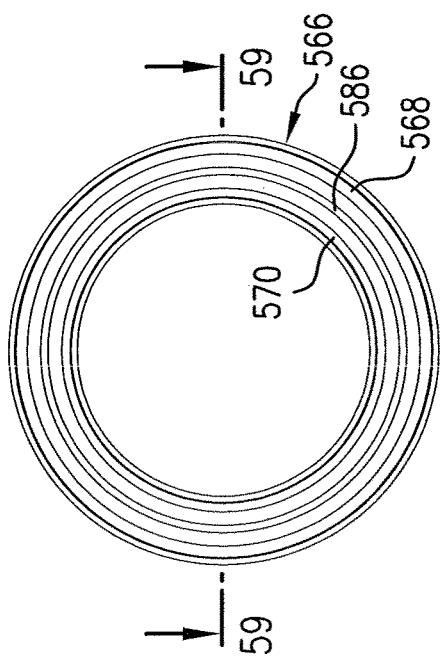
FIG.58
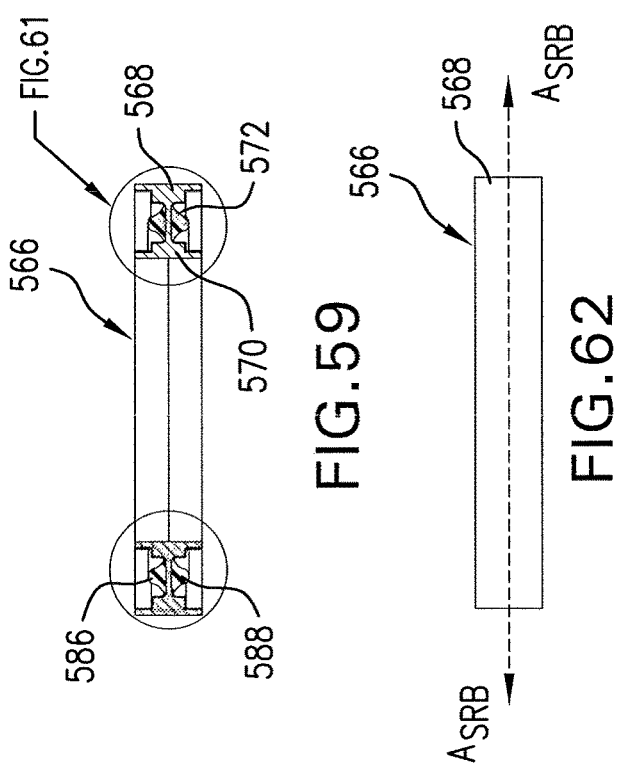
FIG.59
FIG.62

SEALING RINGS AND SEALING RING ASSEMBLIES FOR HIGH TEMPERATURE END APPLICATIONS

CROSS-REFERENCE TO RELATED APPLICATIONS

This application claims the benefit under 35 U.S.C. § 119(e) of U.S. Provisional Patent Application No. 62/254,119, filed Nov. 11, 2015, entitled, "Sealing Rings and Sealing Ring Assemblies for High Temperature End Applications," the entire disclosure of which is incorporated herein by reference.

BACKGROUND OF THE INVENTION

Field of the Invention

This invention relates to the field of sealing assemblies having sealing rings within the assembly, and the sealing rings for use in such assemblies, particularly to those which are useful in semiconductor manufacturing applications, and more particularly to those that are useful in "subfab" areas including for use as vacuum and pressure sealing assemblies including vacuum sealing rings.

Description of Related Art

Sealing assemblies are known for various end applications, for example, for use in sealing joined parts, such as doors, gates, pipes, portals, vents, and similar joining or reversibly mating parts. Sealing assemblies typically incorporate one or more sealing rings and are employed in various industries, such as the fluid handling, aerospace and semiconductor areas. In the semiconductor areas, there are sealing assemblies for doors and gates between various reaction chambers in semiconductor processing equipment in the microchip manufacturing area. There are also seals for use in various assemblies employed in the manufacturing support systems, for example in a "subfab" environment, such as incoming delivery conduit for reactants, air handling conduit and exhaust vacuum system piping.

In many of these industrial end applications, sealing assemblies and their associated sealing rings need to meet various standards. For example, for sealing assemblies in vacuum piping, typical designs may be found as described in German Standard, DIN 28404 (1981) and/or in International Standard ISO 2861 (2013) and International Standard ISO 1206 (1986). As shown in FIG. 1, a standard vacuum seal as in ISO 2861 is shown having an O-ring 1, two vacuum couplings or fittings 2, an O-ring carrier or centering ring 3, and clamps 4. There are a variety of variations on such designs to accommodate different vacuum sealing assembly configurations. Such typical sealing configurations as shown in FIG. 1 are suitable for most applications with use temperatures from room temperature up to about 100° C. Beyond 100° C., typical prior art designs can result in damage to the seals, and potential failure. Further, there is also typically insufficient space in such assemblies for thermal expansion at higher temperatures.

Prior art sealing assemblies are guided by various existing industry specifications, including ISO 2861:2013; ISO 1609: 1986; DIN 28404:1986; DIN 28403: 1986 and PNEUROP 6606: 1981. Such designs describe assemblies as shown, for example, in FIG. 1. Such designs use a T-shaped metal centering ring (o-ring support) as a ring on the inner diameter of the elastomeric sealing ring for use in internal vacuum applications. These designs generally allow room for expansion of the seal at temperatures over about 180° C., but do not allow for internal pressure conditions. Other designs as shown in FIG. 1a have a metal centering ring (o-ring support), overpressure rings and an elastomeric seal. Such designs generally have insufficient space for thermal expansion of the seal. This can cause damage to the seals, particularly when temperatures rise in the end application. Furthermore, these designs typically have a metal inner ring that is mostly rectangular in cross section causing increased exposure of the seal to process gasses. Such designs are useful from room temperature to about 100° C. Beyond this temperature, damage can result to the seal which can lead to potential failure.

The present applicant has a double-lobed seal to improve sealing capability at higher temperatures and having only an inner ring (Greene, Tweed Seal No. 5641-0736-SC513). Such assemblies are an improvement but the seal is still left exposed and there can still be impacts from thermal expansion.

U.S. Pat. No. 6,286,839 shows a vacuum sealing ring having an inner, compressible metal ring that is clamped upon installation in an apparatus. The inner, metal ring has a sideways and outwardly facing, U-shaped cross-sectional profile. The metal ring surrounds an outer elastomeric sealing O-ring having a circular cross-section. The sealing O-ring is compressed within the metal ring in use. The design does not have an outer ring on an exterior of the O-ring. The inner metal ring is shaped to seal the interior space from particulation from the elastomeric O-ring seal. A similar design having an outer seal shaped to complement the interior of the sideways U-shaped inner ring is shown in U.S. Pat. No. 6,357,759. Upon compression, the outer elastomer sealing material filling the interior of the inner metal ring curves outwardly.

U.S. Pat. No. 7,159,906 teaches a metal and/or elastomer ring for a vacuum sealing assembly including vacuum flanges having V-notched receiving areas. The metal flange rings are also shaped on more of a V-shaped exterior surface which angles to a flat outer-facing surface. The modified V-angled portions engage V-notched receiving areas within the flanges. For use with an elastomer seal, the flange lips compress to give the desired seal against the interior sealing ring.

U.S. Pat. No. 6,325,390 shows a vacuum sealing assembly having a centering ring with a circumferential flange (O-ring support) for receiving an O-ring with a circular cross-sectional profile. The centering ring has upper and lower beveled surfaces on its exterior to seat within mating surfaces in the upper and lower vacuum fittings. A clamping ring is used to compress the elastomer.

U.S. Pat. No. 5,722,668 discloses a vacuum sealing assembly incorporating two elastomeric seals, one of which comprises a thermoplastic sacrificial protective collar surrounding the seal. The outer collar may be formed of polyetherether ketone (PEEK), polytetrafluoroethylene (PTFE), polyether sulfone (PES) or polyimide (PI), while the inner seal is formed of a fluoroelastomer. The assembly collar has two fingers that surround a portion of the outer surface of the O-ring seal and also help to seal the space in which the assembly is situated. The design is to provide a shielding effect on one side of the elastomer O-ring seal.

U.S. Pat. No. 6,932,354 teaches a semiconductor manufacturing chamber gate door that incorporates a seal having a cross-sectional view which has a generally parabolic cross-sectional design.

Korean Patent Publication No. KR 2014-073081A shows a seal for a vacuum assembly having a dovetail groove. The embodiments show modified seals having a more "barrel" shape as well.

Korean Patent No. KR 1-471772 B1 of M & EE Technology Co., Ltd. teaches a bonded seal. It has a metallic portion bonded to a perfluoroelastomer (FFKM) seal. The inner and outer rings 100a, 100b are almost a sideways pyramidal shape and are formed of FFKM. The connecting piece that spans between the two rings is formed of a fluorinated resin.

While such designs attempt to create ways to protect the sealing materials from damage and/or from contamination from the seals reaching the environment, a need in the art still exists for sealing assemblies for various sealing configurations between sealing members that provide sufficient space for thermal expansion of the sealing material in the sealing ring and prevent damage to the sealing ring at higher temperatures, while retaining a cohesive assembly upon installation and in use within industrial applications such as internal vacuum, internal pressure, and sanitary liquid sealing assemblies.

BRIEF SUMMARY OF THE INVENTION

In an embodiment herein, the invention includes a sealing assembly for a high temperature applications, comprising: an outer ring having an interior surface having two inwardly extending projections defining a seal receiving area; an inner ring having an exterior surface having two outwardly extending projections defining a seal receiving area; a center sealing ring configured to be positioned within the seal receiving areas of the outer ring and the inner ring, wherein when the sealing assembly is installed in a high temperature application, the elastomeric center sealing ring is enclosed within the outer and the inner rings so as to protect the center sealing ring while allowing for thermal expansion of the center sealing ring.

The high temperature application may be a vacuum sealing assembly for use in semiconductor manufacturing. High temperature applications in embodiments herein may be service temperatures of about 100° C. to about 300° C., and in another embodiment, service temperatures of about 180° C. to about 300° C.

The center sealing ring may comprise an elastomer, preferably a fluoroelastomer or a perfluoroelastomer.

In a preferred embodiment, the seal receiving area of the outer ring of the above-described assembly has a longitudinal cross-sectional profile of an inwardly facing truncated V. The inwardly facing projections of the outer ring may be each spaced from each other and each spaced from a longitudinal center of the interior surface of the outer ring by a distance of about 50% to about 60% of a height of the interior surface of the outer ring. Each inwardly facing projection of the outer ring may be angled away from a transverse central axis through the outer ring and from each other, and each may form an angle of about 5° to about 25° with the transverse central axis of the outer ring, and preferably forms an angle of about 10° to about 20° with the transverse central axis of the outer ring.

In a preferred embodiment, the seal receiving area of the inner ring may have a longitudinal cross-sectional profile of an outwardly facing truncated V. The outwardly facing projections of the inner ring may be each spaced from each other and each spaced from a longitudinal center of the exterior surface of the inner ring by a distance of about 43% to about 53% of a height of the exterior surface of the inner ring. Each outwardly facing projection of the inner ring may be angled away from a transverse central axis through the inner ring and from each other, and may each form an angle of about 5° to about 25° with the transverse central axis of the inner ring, and preferably angle of about 10° to about 20° with the transverse central axis of the inner ring.

In a further preferred embodiment, the seal receiving area of the outer ring has a longitudinal cross-sectional profile of an inwardly facing truncated V and the seal receiving area of the inner ring has a longitudinal cross-sectional profile of an outwardly facing truncated V. In such an embodiment, the inwardly facing projections of the outer ring may each spaced from each other and may each be spaced from a longitudinal center of the interior surface of the outer ring by a distance of about 50% to about 60% of a height of the interior surface of the outer ring. The outwardly facing projections of the inner ring may each be spaced from each other and each be spaced from a longitudinal center of the exterior surface of the inner ring by a distance of about 43% to about 53% of a height of the exterior surface of the inner ring. Further, each inwardly extending projection of the outer ring may be angled away from a transverse central axis through the outer ring and from each other, and each may form an angle of about 5° to about 25° with the transverse central axis of the outer ring, preferably about 10° to about 20°, and each outwardly extending projection of the inner ring may also be angled away from a transverse central axis through the inner ring and from each other, and each may also form an angle of about 5° to about 25°, preferably about 10° to about 20°, with the transverse central axis of the inner ring.

Also in such an embodiment, the center sealing ring may have varying shapes including a longitudinal cross-section that has a side-ways barrel shape; a truncated side-ways tear drop shape with an inner facing side that is flat and an outer facing side that is curved, wherein the inner facing side is smaller than the outer facing side; and a truncated side-ways tear drop shape with an inner facing side that is curved and an outer facing side that is curved, and wherein the inner facing side is smaller than the outer facing side. The center sealing ring may also have a truncated side-ways tear drop shape with an inner facing side that is flat and an outer facing side that is flat, and wherein the inner facing side is smaller than the outer facing side.

In another embodiment herein, the invention includes a sealing assembly for a high temperature application, comprising: an outer ring having an interior surface having two inwardly extending projections defining a seal receiving area; an inner ring having an exterior surface having an outwardly extending rectangular portion on a central portion of the exterior surface of the inner ring and a further rounded projection extending outwardly from the rectangular portion; a center sealing ring having a longitudinal cross-section that is inwardly facing and generally C-shaped to define an inner ring receiving area, wherein the center sealing ring is configured to be positioned within the seal receiving area of the outer ring and to receive the outwardly extending rounded projection of the inner ring within the inner ring receiving area, and wherein when the sealing assembly is installed in a high temperature application, the elastomeric center sealing ring is enclosed within the outer ring and compressed against the inner ring so as to protect the center sealing ring while allowing for thermal expansion of the center sealing ring.

The seal receiving area of the outer ring in this embodiment may have a longitudinal cross-sectional profile of an inwardly facing truncated V. The inwardly facing projections of the outer ring may each be spaced from each other and each spaced from a longitudinal center of the interior surface of the outer ring by a distance of about 50% to about 60% of a height of the interior surface of the outer ring. Each inwardly facing projection of the outer ring may be angled away from a transverse central axis through the outer ring and from each other, and each forms an angle of about 5° to about 25° with the transverse central axis of the outer ring, and preferably about 10° to about 20° with the transverse central axis of the outer ring.

The outer ring and/or the inner ring in this embodiment may comprise one or more of a metal, a metal alloy or a fluoropolymer. The outer ring and/or the inner ring may comprise a metal or metal alloy such as aluminum 6061, aluminum 7075, stainless steel 316, and/or stainless steel 304. The outer ring and/or the inner ring may also comprise a fluoropolymer such as polytetrafluoroethylene (PTFE), a copolymer of perfluoroalkylvinyl ether (PAVE) and tetrafluoroethylene (TFE) such as Teflon PFA and other similar melt-processible copolymers, and/or a copolymer of hexafluoropropylene (HFP) and PTFE such as Teflon FEP and similar melt-processible copolymers. The center sealing ring may comprise a fluoroelastomer or a perfluoroelastomer.

In yet a further embodiment herein, the invention includes a bonded sealing assembly for a high temperature application, comprising: a sealing ring body having a longitudinal cross-section that has an outer ring portion, an inner ring portion and a central transversely extending bridge extending between the outer and the inner ring portions, wherein the outer ring portion has an inwardly extending rectangular portion and the inner ring portion has an inwardly extending rectangular portion, each of the rectangular portions of the inner ring portion and the outer ring portions being positioned so as to be longitudinally centered with respect to a central transverse axis through the sealing ring body, wherein the bridge has an upper surface and a lower surface, and wherein the outer and inner ring portions together with and the bridge define upper and lower seal receiving areas; and an upper seal lobe portion and a lower seal lobe portion, each bonded respectively to the upper surface and the lower surface of the bridge and each respectively located within the seal receiving areas of the sealing ring body, wherein the upper and the lower seal lobe portions have respectively an upwardly extending and a downwardly extending generally parabolic longitudinal cross-section.

In this embodiment, the sealing ring body may comprise a metal, a metal alloy and/or a fluoropolymer. The upper and lower seal lobe portions may comprise an elastomer. The sealing ring body and the seal lobe portions may be chemically or mechanically bonded.

The sealing ring body may further be a metal or a metal alloy such as aluminum 6061, aluminum 7075, stainless steel 316, and/or stainless steel 304. The sealing ring body may include a fluoropolymer such as PTFE, a copolymer of PAVE and TFE, and a copolymer of HFP and TFE. The elastomer in the seal lobe portions may comprise a perfluoroelastomer or a fluoroelastomer.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 2 is a perspective view of an outer ring for use in various embodiments of a sealing assembly according to the invention;

FIG. 3 is a top elevational view of the outer ring of FIG. 2;

FIG. 4 is a longitudinal cross-sectional view of the outer ring of FIG. 3 taken along line 4-4;

FIG. 5 is an enlarged portion of the outer ring of FIG. 4;

FIG. 6 is a side elevational view of the outer ring of FIG. 2;

FIG. 7 is a perspective view of an inner ring for use in various embodiment of a sealing assembly according to the invention;

FIG. 8 is a top elevational view of the inner ring of FIG. 7;

FIG. 9 is a longitudinal cross-sectional view of the inner ring of FIG. 8 taken along line 9-9;

FIG. 10 is an enlarged portion of the inner ring of FIG. 9;

FIG. 11 is a side elevational view of the inner ring of FIG. 7;

FIG. 27 is perspective view of a center sealing ring of the assembly of FIG. 26;

FIG. 28 is a top elevational view of the center sealing ring of FIG. 27;

FIG. 29 is a longitudinal cross-sectional view of the center sealing ring of FIG. 28 taken along line 29-29;

FIG. 30 is an enlarged portion of the sealing ring of FIG. 29;

FIG. 31 is a side elevational view of the center sealing ring of FIG. 27;

FIG. 41 is a perspective view of an outer ring for use in various embodiments of the sealing assemblies herein;

FIG. 42 is a top elevational view of the outer ring of FIG. 41;

FIG. 43 is a longitudinal cross-sectional view of the outer ring of FIG. 42 taken long line 43-43;

FIG. 44 is an enlarged portion of the outer ring of FIG. 43;

FIG. 45 is a side elevational view of the outer ring of FIG. 41;

FIG. 46 is a perspective view of an inner ring for use with the sealing assembly of FIG. 40;

FIG. 47 is a top elevational view of the inner ring of FIG. 46;

FIG. 48 is a longitudinal cross-sectional view of the inner ring of FIG. 47 taken long line 48-48;

FIG. 49 is an enlarged portion of the inner ring of FIG. 48;

FIG. 50 is a side elevational view of the inner ring of FIG. 46;

FIG. 51 is a perspective view of a center sealing ring for use in the assembly of FIG. 40;

FIG. 52 is a top elevational view of the center sealing ring of FIG. 51;

FIG. 53 is a longitudinal cross-sectional view of the center sealing ring of FIG. 52 taken along line 53-53;

FIG. 54 is an enlarged portion of the center sealing ring of FIG. 53;

FIG. 55 is a side elevational view of the center sealing ring of FIG. 51;

FIG. 58 is a top elevational view of a bonded sealing ring body of the assembly of FIG. 57;

FIG. 59 is a longitudinal cross-sectional view of a bonded sealing ring body of FIG. 58 taken along line 59-59 with blacked-out portions so as to highlight on either side of the Figure either the sealing ring body (FIG. 61) or the upper and lower sealing lobes of the bonded sealing ring body (FIG. 60);

FIG. 60 is an enlarged portion of the bonded sealing ring body of FIG. 59 highlighting the upper and lower sealing lobes;

FIG. 61 is an enlarged portion of the bonded sealing ring body of FIG. 59 highlighting the sealing ring body; and FIG. 62 is a side elevational view of the bonded sealing ring body of FIG. 59.

DETAILED DESCRIPTION OF THE INVENTION

Figure 1:
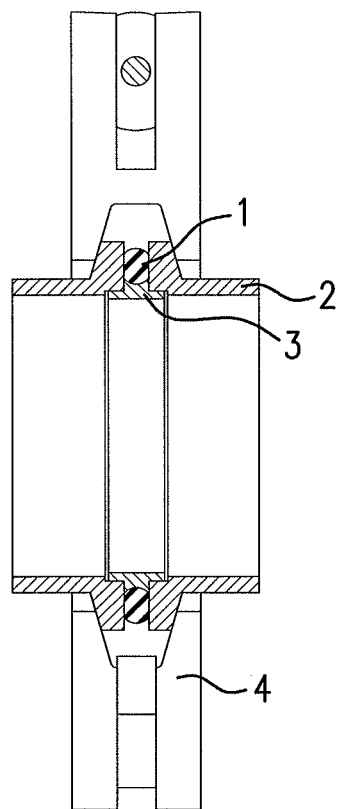
FIG. 1 is a longitudinal cross-sectional view of a prior art vacuum sealing assembly with a centering ring only.
Figure 1A:
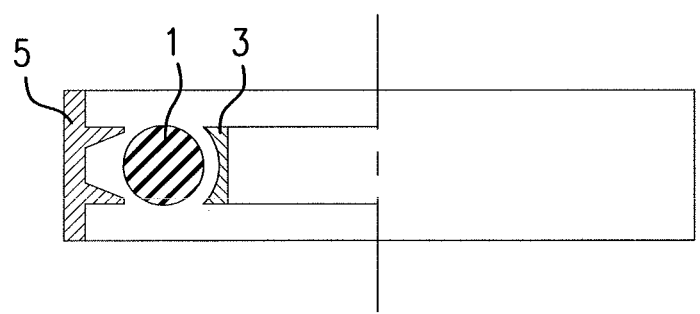
FIG. 1A is a longitudinal cross-sectional view of prior art vacuum sealing assembly with an inner centering ring and outer overpressure ring.

The invention herein provides various configurations of sealing assemblies that offer solutions in the art to prevent seal damage and/or seal failure due to issues that arise in high temperature end applications both as due to the inability of prior art designs to accommodate sufficient thermal expansion of the assembly, particularly the inner sealing member and/or due to seal deterioration from the impact of aggressive reactants or the sealing environment, which impact can be further exacerbated in high temperature applications. Without intending to be limiting, the present assemblies provide for adequate thermal expansion space, maintain a cohesive sealing assembly in use in high temperature end applications and also protect the center sealing member.

Such sealing assemblies are useful in a wide variety of end applications in the fluid handling, aerospace and semiconductor fields, among others, and represent solutions to issues involved in such fields particularly where (i) sealing members of sealing assemblies are subject to damage and/or deterioration from aggressive process reactants or byproducts and/or from an aggressive process environment at any temperature service range and/or (ii) when sealing assemblies including sealing members are employed in a high temperature end applications, such as those over a service temperature of 100° C. For example, such assemblies find particular usefulness in vacuum sealing assemblies employed in "subfab" areas of semiconductor manufacturing facilities, but are also useful in process equipment gates, doors, and the like.

As used herein, words such as "inner" and "outer," "upper" and "lower," "top" and "bottom," "left" and "right," "inwardly" and "outwardly" and words of similar import are intended to assist in understanding preferred embodiments of the invention with reference to the accompanying drawing Figures and with respect to the orientation of the sealing assemblies as shown in the Figures, and are not intended to be limiting to the scope of the invention or to limit the invention scope to the preferred embodiments shown in the Figures. The embodiments herein each use like reference numbers to refer to analogous features of the invention as described herein and as shown in the drawings, such that absent language to the contrary describing an alternative configuration for a particular feature, one skilled in the art would understand, based on this disclosure and the drawings attached hereto, that description of one such feature is applicable to an analogous feature in another embodiment herein unless otherwise specified.

The sealing assemblies herein present a sealing rings having custom cross-sectional configurations which, when combined with customized inner and outer rings in the assemblies, reduce seal volume, while increasing gland volume so as to create room for the sealing member to expand thermally and help to prevent damage to the sealing ring in use in aggressive and/or high temperature end applications. The custom profiles are also designed to keep the inner and outer rings and sealing member cohesive and together in use so as to aid in the ease of installation of the overall sealing assembly, for example, in piping components. The specialty inner and outer rings help to reduce the amount of direct process exposure of the center sealing ring.

In a first embodiment herein, shown with varying center sealing ring cross-sectional configurations in FIGS. 2-38, the invention includes a sealing assembly, generally referred to herein as assembly 10. The assembly includes an outer ring 12 having an interior surface 14 and an exterior surface 15. The interior surface 14 includes two inwardly extending projections 16, identified independently as 16a, 16b, which together define a seal receiving area 18. The projections preferably extend circumferentially around the entire outer ring, however, one skilled in the art would understand that it is within the scope of the invention, based on this disclosure, that a gap or opening or periodic openings may be provided if the end user elects to incorporate them, without departing from the invention. It is preferred that for achieving the best level of seal protection and for maintaining a cohesive assembly, the projections 16 extend around the entire outer ring 12.

The exterior facing sides 20 of the projections 16 may be oriented with respect to a transverse central axis $A_{OR}$ through the outer ring in parallel or an angle. As shown, each exterior facing side 20a, 20b of respective projections 16a, 16b is in parallel to axis $A_{OR}$. The interior facing sides 22 of the projections 16 may be similarly oriented, to the exterior facing sides, or more preferably as shown, each interior facing side 22a, 22b is angled at a respective angle α, α' with respect to the central transverse axis $A_{OR}$ of the outer ring. The angles are preferably the same, but may vary depending on sealing member design. As shown, they are the same.

The outer ring, as well as the inner ring, described below herein, are each preferably formed so as to include one or more of a metal, a metal alloy or either a heat-moldable or heat sinterable fluoropolymer. Thus, the outer ring and/or inner ring may include various metals or alloys thereof for appropriate use in the designated end application. Suitable metals and metal alloys for use in semiconductor and/or high temperature processing applications include, but are not limited to, aluminum 6061, aluminum 7075, stainless steel 316, and/or stainless steel 304. Suitable fluoropolymers, include, without limitation, polytetrafluoroethylene (PTFE) as well as melt-processible fluoroplastic fluoropolymers such as copolymers of perfluoroalkylvinyl ether (PAVE) and tetrafluoroethylene (TFE), commonly known in the art as Teflon™ PFA, copolymers of hexafluoropropylene (HFP) and TFE such as Teflon™ FEP and other suitable melt-processible copolymers. Depending on the end use, other composite or polymeric molding materials may be suitable, including, without limitation, acrylonitrile-butadiene-styrene (ABS), ethylene-propylene copolymers, polyethersulfones, polyolefins, polyvinyl chlorides, polyimides, polyetherimides, polyamides, polystyrene, polyethylene terephthalate and the like.

As used herein, when referencing high temperature end applications, it is the applicant's intention, that such term relates to service temperatures of about 100° C. to about 300° C., and in other embodiments, to service temperatures of about 180° C. to about 300° C. Such temperatures are considered in the art to be high temperature end applications, for example, for vacuum sealing assemblies for use in semiconductor manufacturing.

The outer ring will have dimensions configured to mate with an appropriately sized assembly flange and clamp fittings so as to be adaptable to existing piping or other fitted parts. Suitable outer ring dimensions include outer diameters (OD) of about 3 cm to about 8 cm. An inner diameter (ID) will vary somewhat depending on whether it is measured above or below the projections or within the seal receiving area 18 between the projections. On the portions of the outer ring above and below the projections (exterior to surfaces 20a, 20b), the ID is preferably about 2.7 cm to about 7.7 cm. Within the seal receiving area 18 as measured at the central transverse axis $A_{OR}$, the ID is about 2.5 cm to about 7.5 cm. The outer ring may also have a varying height depending on end application, as measured longitudinally along the exterior of the outer ring, of about 6 cm to about 1.2 cm. The projections 16 of the outer ring 12 preferably create a seal receiving area that extends outwardly so as to go into the outer ring body while leaving the portions of the outer ring exterior to the projections thicker as noted above with respect to the ID dimensions. It will be understood by one skilled in the art, based on this disclosure that the projection angles, ring thickness and sizing can be varied within the scope of the invention.

The inner ring 24 for use with assembly 10 has an exterior surface 26 and an interior surface 28. The exterior surface 26 preferably has two outwardly extending projections 30 (independently 30a, 30b) that together define a seal receiving area 32. The projections 30 preferably extend circumferentially around the entire inner ring, however, one skilled in the art would understand that it is within the scope of the invention, based on this disclosure, that a gap or opening or periodic openings may be provided if the end user elects to incorporate them, without departing from the invention. It is preferred that for achieving the best level of seal protection and for maintaining a cohesive assembly, however, that the projections 30 extend around the entire inner ring 24.

The exterior facing sides 34 (independently 34a, 34b) of the projections 30 may be oriented with respect to a transverse central axis $A_{IR}$ through the inner ring in parallel or at an angle. As shown, each exterior facing side 34a, 34b of respective projections 30a, 30b is in parallel to axis $A_{IR}$. The interior facing sides 36 (independently 36a, 36b) of the projections 30 may be similarly oriented, to the exterior facing sides, or more preferably as shown, each interior facing side 36a, 36b is angled at a respective angle β, β' with respect to the central transverse axis $A_{IR}$ of the inner ring. The angles are preferably the same, but may vary depending on sealing member design. As shown, they are the same.

The inner ring 24 may be formed using any of the materials noted above with respect to the outer ring 12. The inner ring will have dimensions configured to mate with an appropriately sized assembly flange and clamp fittings as well as so that the projections 30a, 30b of the inner ring 24 contact or mate with the projections 16a, 16b, respectively of the outer ring 12. The inner ring dimensions, like the outer ring dimension should be varied so as to be adaptable to existing piping or other fitted parts. Suitable inner ring dimensions include inner diameters (ID) of about 1.5 cm to about 6.2 cm. An outer diameter (OD) will vary somewhat depending on whether it is measured above or below the projections 30a, 30b or within the seal receiving area 32 between the projections 30. On the portions of the inner ring above and below the projections (exterior to surfaces 34*a*, 34*b*), the OD is preferably about 1.0 cm to about 5.3 cm. Within the seal receiving area 32 as measured at the central transverse axis $A_{IR}$, the OD is about 1.2 cm to about 5.7 cm. The inner ring may also have a varying height depending on end application, as measured longitudinally along the exterior of the inner ring, of about 7 cm to about 1.4 cm. The projections 30 of the outer ring 24 preferably create a seal receiving area 32 that extends inwardly into the inner ring body from the exterior surface while leaving the portions of the inner ring exterior to the projections 30 thicker as noted above with respect to the OD dimensions. It will be understood by one skilled in the art, based on this disclosure that the projection angles, ring thickness and sizing can be varied within the scope of the invention.

In a preferred embodiment, the seal receiving area 18 of the outer ring 12 of the above-described assembly 10 has a longitudinal cross-sectional profile as shown in FIGS. 2-5 of an inwardly facing truncated "V". The inwardly facing projections 16 of the outer ring 12 are preferably spaced from each other and each is preferably also spaced from a longitudinal center of the interior surface (the transverse longitudinal axis of the outer ring $A_{OR}$) of the outer ring 12 by a distance of about 50% to about 60% of a height $H_{OR}$ of the interior surface 14 of the outer ring 12. Each inwardly facing projection 16 of the outer ring 12 as discussed above may be angled away from the transverse central axis through the outer ring $A_{OR}$ and from each other, and each may form an angle α, α' respectively of about 5° to about 25° with the transverse central axis of the outer ring, and preferably an angle of about 10° to about 20° with the transverse central axis of the outer ring.

It is further preferred that the seal receiving area 32 of the inner ring 24 has a longitudinal cross-sectional profile of an outwardly facing truncated "V". The outwardly facing projections 30*a*, 30*b* of the inner ring 24 may be each spaced from each other and each spaced from a longitudinal center (i.e., the longitudinal axis) of the exterior surface of the inner ring $A_{IR}$ by a distance of about 43% to about 53% of a height $H_{IR}$ of the exterior surface of the inner ring 24. Each outwardly facing projection 30*a*, 30*b* of the inner ring 24 may be angled away from the transverse central axis $A_{IR}$ through the inner ring 24 and from each other, and each preferably forms an angle β, β' of about 5° to about 25° with the transverse central axis $A_{IR}$ of the inner ring, more preferably an angle of about 10° to about 20° with the transverse central axis of the inner ring.

In a further preferred embodiment, both the seal receiving area of the outer ring and the seal receiving area of the inner have longitudinal cross-sectional profiles of an inwardly facing truncated "V" and an outwardly facing truncated "V" as shown in FIGS. 2-4, 7-10 and 13 and as described above with respect to each ring individually.

Figure 13:
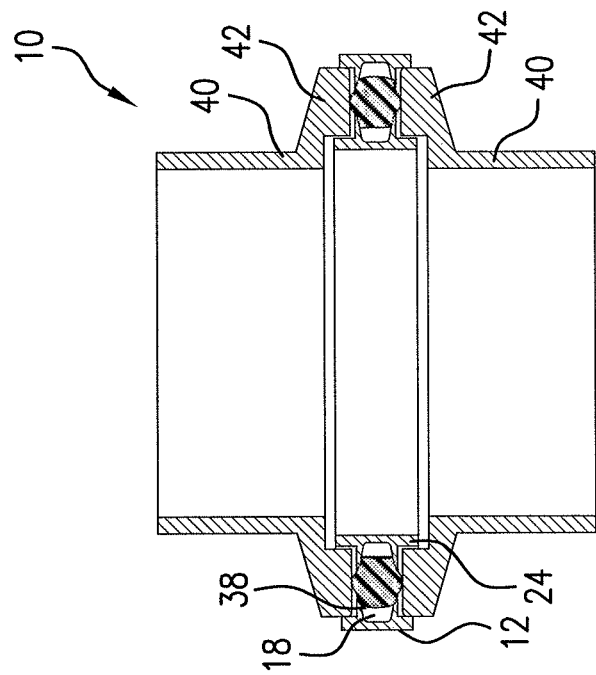
FIG. 13 is a longitudinal cross-sectional view of the sealing assembly according to FIG. 12 taken along line 13-13.
Figure 12:
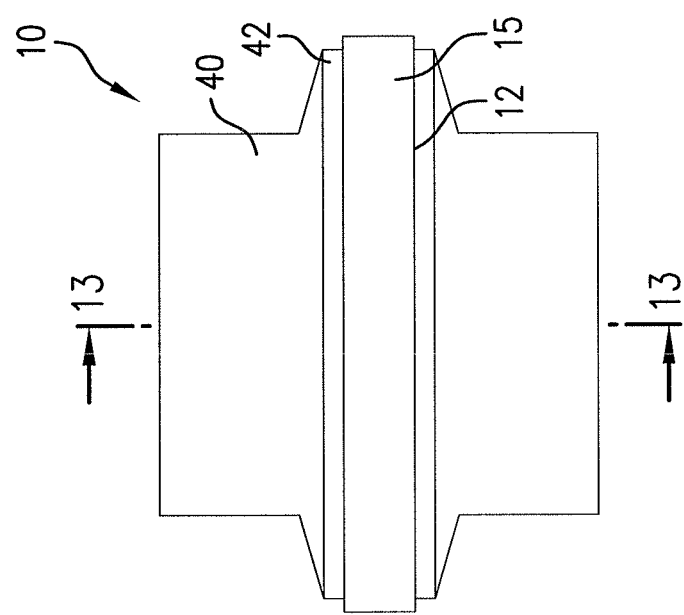
FIG. 12 is a side-elevational view of a sealing assembly according to an embodiment herein having a side-ways barrel-shaped center sealing ring.
Figure 16:
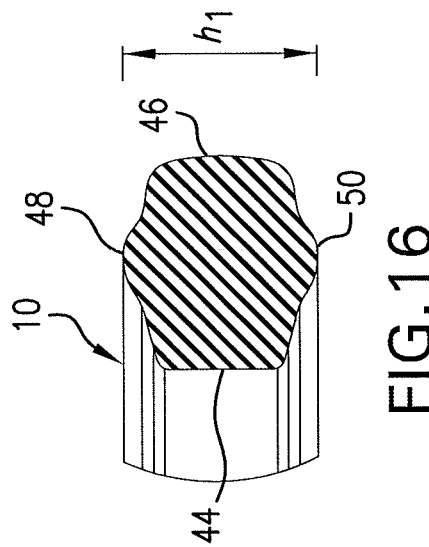
FIG. 16 is an enlarged portion of the center sealing ring of FIG. 15.
Figure 17:
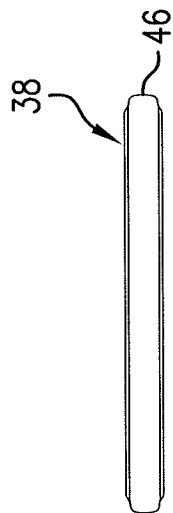
FIG. 17 is a side elevational view of the center sealing ring of FIG. 13.
Figure 14:
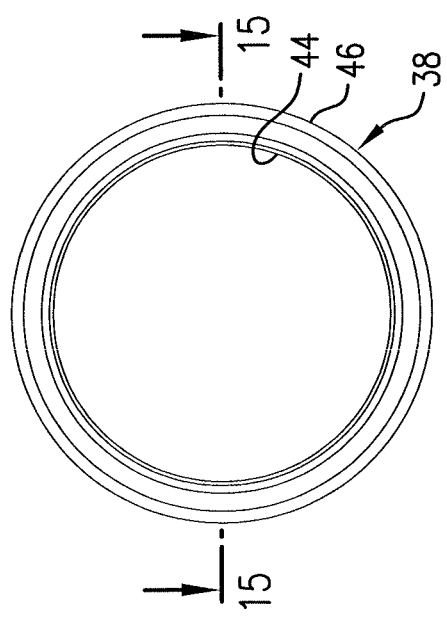
FIG. 14 is a top elevational view of the center sealing ring of FIG. 13.
Figure 15:
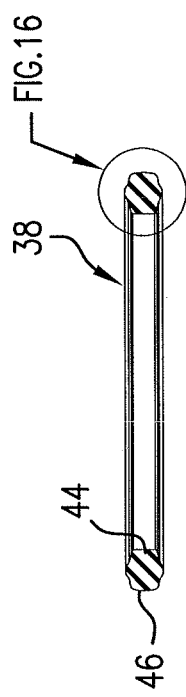
FIG. 15 is a longitudinal cross-sectional view of the center sealing ring of FIG. 13.
Figure 19:
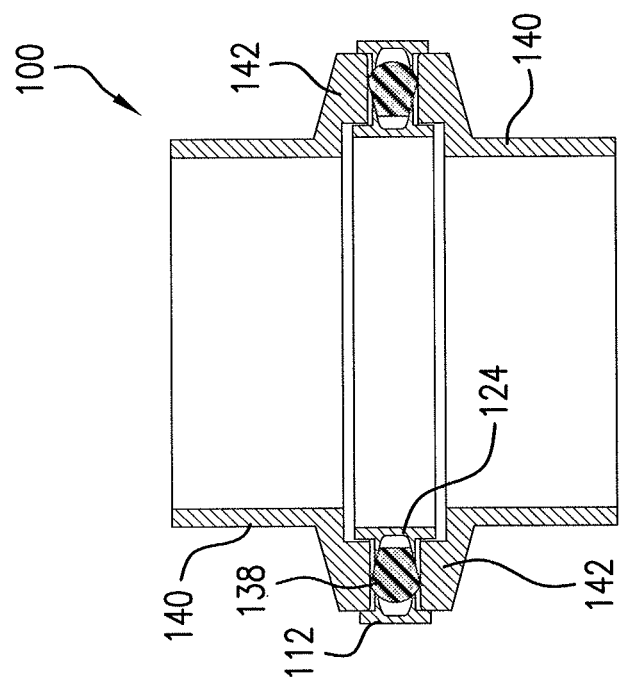
FIG. 19 is a longitudinal cross-sectional view of the sealing assembly according to claim 18 taken along line 19-19.
Figure 18:
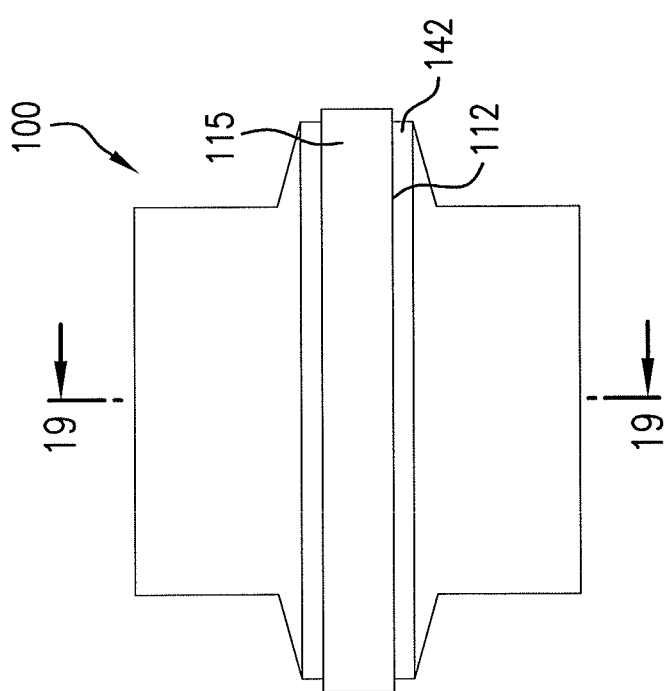
FIG. 18 is a side elevational view sealing assembly according to a further embodiment of the invention having a truncated side-ways tear drop shape, wherein the inner facing side is flat and the outer facing side is curved and wherein the inner facing side is smaller than the outer facing side.
Figure 22:
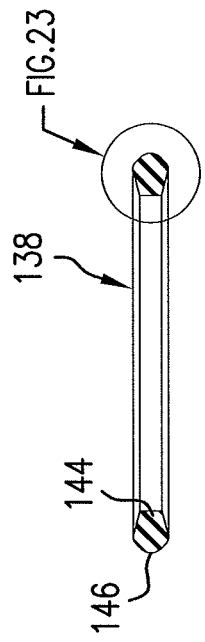
FIG. 22 is a longitudinal cross-sectional view of the center sealing ring of FIG. 21 taken along line 22-22.
Figure 23:
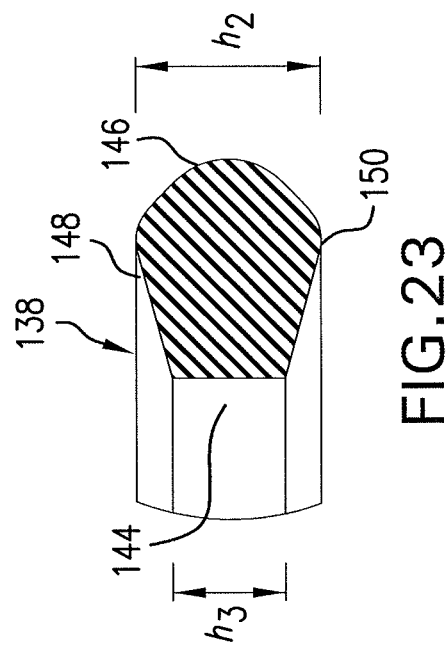
FIG. 23 is an enlarged portion of the center sealing ring of FIG. 22.
Figure 24:
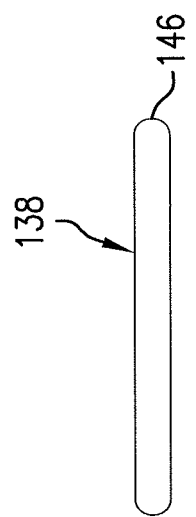
FIG. 24 is a side elevational view of the center sealing ring of FIG. 19.
Figure 20:
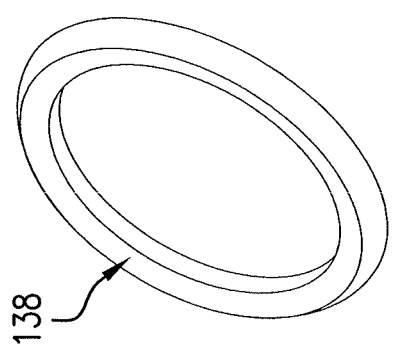
FIG. 20 is a perspective view of the center sealing ring of FIG. 19.
Figure 21:
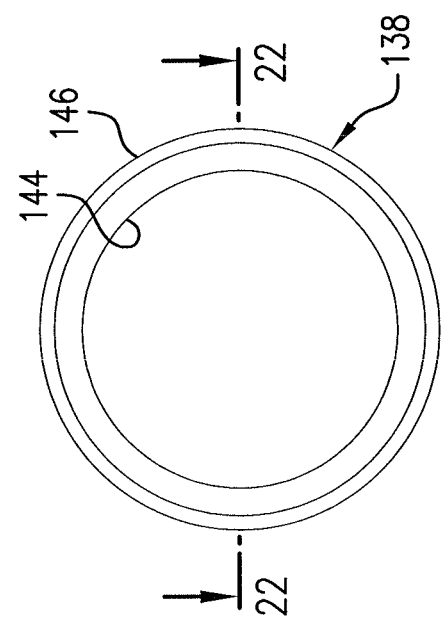
FIG. 21 is a top elevational view of the center sealing ring of FIG. 19.
Figure 26:
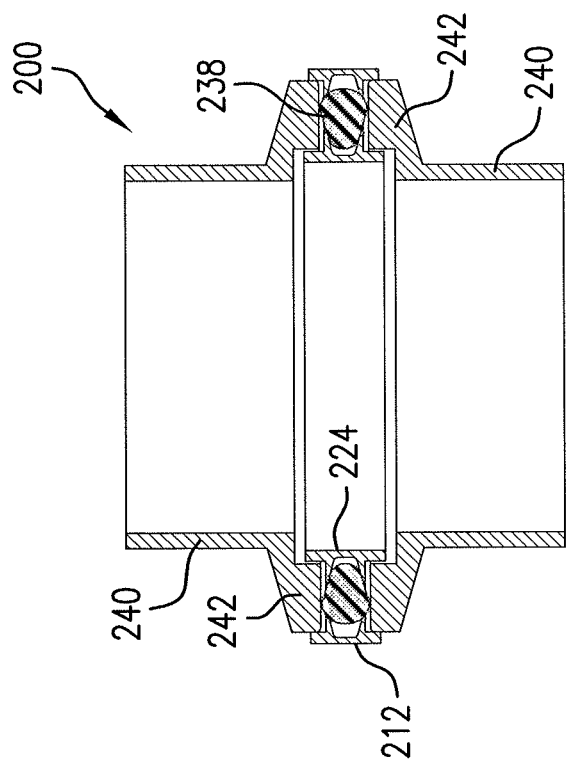
FIG. 26 is a longitudinal cross-sectional view of the sealing assembly according to FIG. 25.
Figure 25:
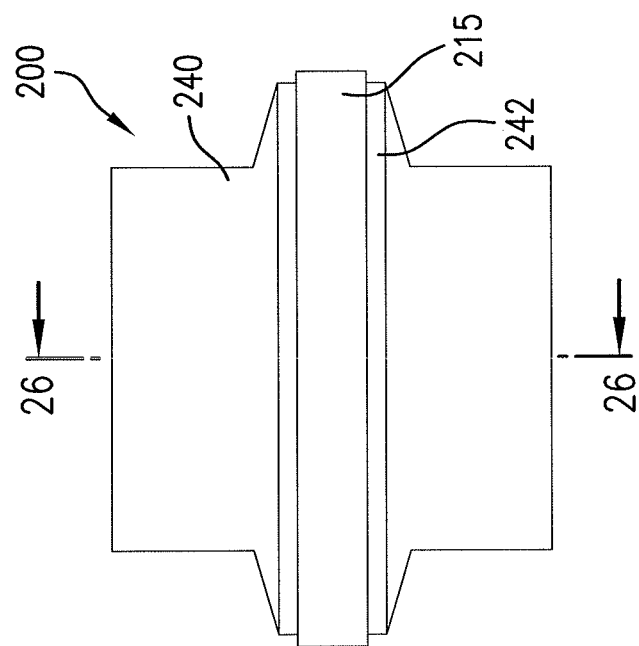
FIG. 25 is a side elevational view of a sealing assembly according to yet a further embodiment of the invention having a truncated side-ways tear drop shape having an inner facing side that is curved and an outer facing side that is curved, wherein the inner facing side is smaller than the outer facing side.
Figure 33:
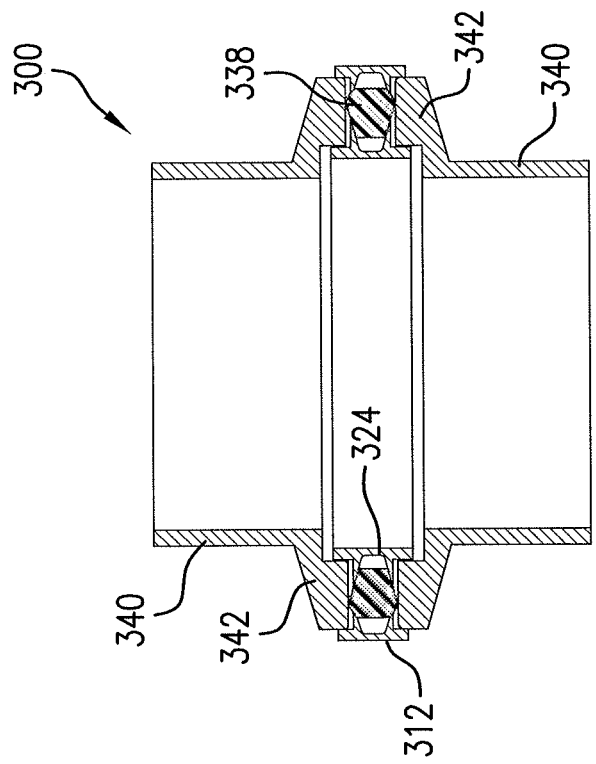
FIG. 33 is a longitudinal cross-sectional view of the sealing assembly of FIG. 32 taken along line 33-33.
Figure 32:
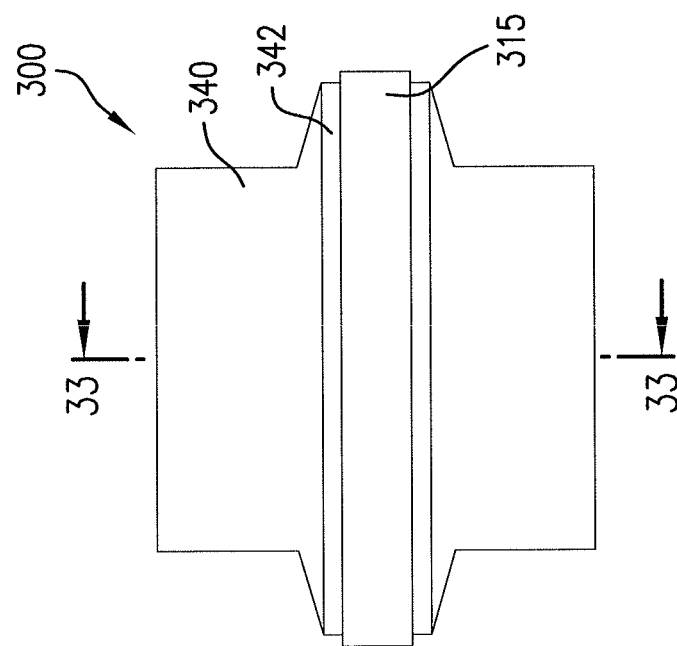
FIG. 32 is a side elevational view of a sealing assembly in accordance with another embodiment of the invention having a truncated side-ways tear drop shape with an inner facing side that is flat and an outer facing side that is flat, wherein the inner facing side is smaller than the outer facing side.
Figure 36:
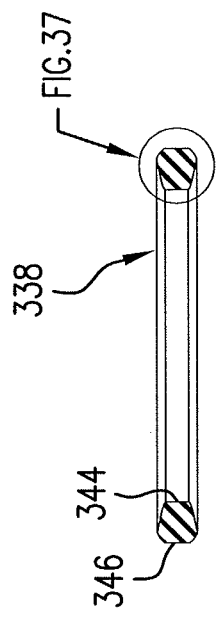
FIG. 36 is a longitudinal cross-sectional view of the center sealing ring of FIG. 35 taken along line 36-36.
Figure 37:
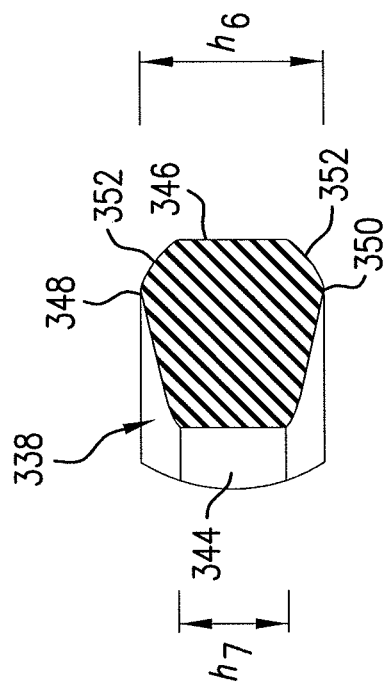
FIG. 37 is an enlarged portion of the center sealing ring of FIG. 36.
Figure 38:
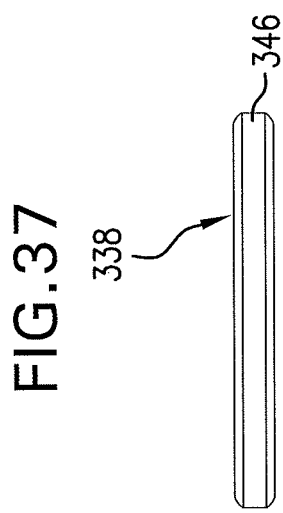
FIG. 38 is a side elevational view of the center sealing ring of FIG. 34.
Figure 34:
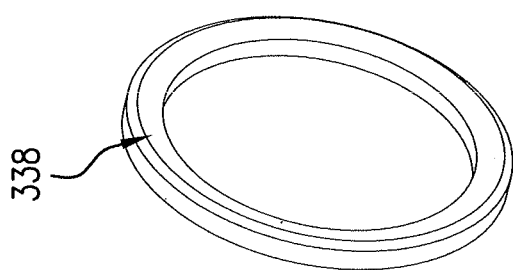
FIG. 34 is a perspective view of the center sealing ring of the assembly of FIG. 33.
Figure 35:
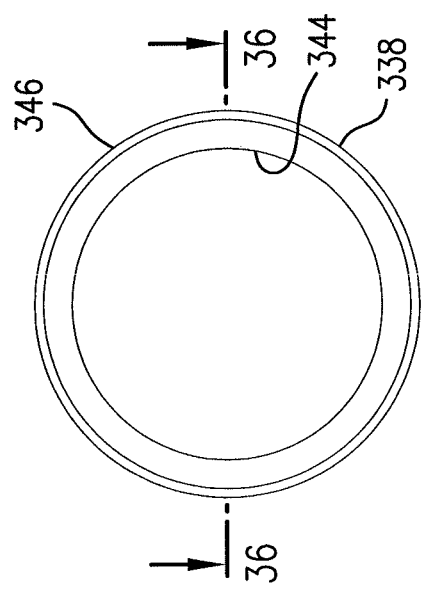
FIG. 35 is a top elevational view of the center sealing ring of FIG. 34.

The assembly 10 further includes a center sealing ring 38 configured to be positioned within the seal receiving areas 18, 32 of the outer ring 12 and the inner ring 24, respectively. When the sealing assembly 10 is installed in a high temperature application, the elastomeric center sealing ring 38 is enclosed as shown (see FIGS. 12, 13) within the outer ring 12 and the inner ring 24 so as to protect the center sealing ring 38 while allowing for thermal expansion of the center sealing ring 38. As shown in FIG. 13, the outer and inner rings are assembled around the center sealing ring 38 and are positioned between two mating parts, such as vacuum parts 40. In position, the outer ring 12 sits so that its exterior ring body portion is outside of parts 40, and the projections 16*a*, 16*b* extend inwardly between parts 40. Parts 40 have mating flanges 42 configured to press against the contacting or mating projections 16, 30 of the outer and inner rings assembled. The inner ring 24 is seated within the parts 40 so that the inner ring body is positioned inwardly to the mating flanges 42 and the projections 30 of the inner ring are within the mating flanges 42. In use, a clamp of any suitable configuration as are known in the art may be used to press the flanges together so as to hold the sealing assembly in place.

The center sealing ring 38 is preferably formed of an elastomeric material (which may have various additives as are known in the art). For applications at high temperature and/or high pressure or employing aggressive environments or reactants, a fluoroelastomer (FKM) or a perfluoroelastomer (FFKM) are preferred. Suitable materials are available from a number of suppliers, including but not limited to Greene, Tweed, of Kulpsville, Pa., Dyneon of Minneapolis, Minn., Daikin Industries, Ltd., of Japan, Solvay, of Italy, and DuPont Elastomers, LLC of Wilmington, Del. For other end applications, other elastomers may be used including silicone elastomers, nitrile elastomers, and various diene elastomers, ethylene-propylene rubber and the like.

In this preferred embodiment, the center sealing ring 38 may have varying shapes. As shown in FIGS. 13-17, the center sealing ring 38 has a longitudinal cross-section that has a side-ways barrel shape. The center sealing ring 38 has an interior facing surface 44 and an exterior facing surface 46. Each is a truncated flat surface which may have somewhat rounded or sharp edges as each meets the upper and lower surfaces 48, 50, respectively. The upper and lower surfaces have a curved bump extending outwardly in the upward and downward directions as shown best in FIG. 16. The curved bump seals tightly against the contacting or mating projections 16, 30 of the respective outer and inner rings 12, 24.

The barrel-shaped embodiment as shown preferably has an ID of about 1.5 cm to about 5.6 cm and an OD of about 2.5 cm to about 6.8 cm. The height of the seal at its largest dimension measured across the center of each upper and lower curved bump on the upper and lower surface 48, 50 respectively is about 0.45 cm to about 0.51 cm. At the ID and OD, the height $h_1$ measures about 0.25 cm to about 0.40 cm. The size and angled configuration may be varied within the truncated sideways barrel embodiment to accommodate varying projection and ring designs within the scope of the invention.

As shown in FIGS. 18-24, an assembly 100 is provided having an outer ring 112 and an inner ring 124 which are essentially the same as the outer and inner rings 12, 24 of assembly 10, with the understanding that with a variation in center sealing ring configuration, one may adjust the outer and inner ring dimensions if desired. As shown in FIGS. 19 and 21-23, the assembly 100 has a center sealing ring 138 having a truncated side-ways tear drop shape with an inner facing side 144 that is flat and an outer facing side 146 that is curved, wherein the inner facing side 144 is preferably smaller in height than the outer facing side 146. The height of such a design would decrease on both the upper side 148 and the lower side 150 of the center sealing ring 138 at a constant rate of decreasing height to provide the desired shape.

The truncated side-ways tear drop-shaped embodiment as shown preferably has an ID of about 1.5 cm to about 5.9 cm and an OD of about 2.5 to about 7 cm. The height $h_2$ of the seal on its OD at its largest dimension measured between the highest and lowest points on the exterior portion on each of the upper and lower surfaces 148, 150, respectively, is about 0.45 cm to about 0.51 cm. At the ID, the height $h_3$ measures about 0.27 cm to about 0.33 cm. The size and angled configuration may be varied within the truncated sideways tear drop shaped embodiment having a flat inner side and a rounded outer side to accommodate varying projection and ring designs within the scope of the invention.

As shown in FIGS. 25-31, a further an assembly 200 is provided having an outer ring 212 and an inner ring 224 which are also essentially the same as the outer and inner rings 12, 24 of assembly 10, with the understanding that with a variation in center sealing ring configuration, one may adjust the outer and inner ring dimensions if desired. As shown in FIGS. 26 and 28-30, the assembly 200 has a center sealing ring 238 having a truncated side-ways tear drop shape with an inner facing side 244 that is curved and an outer facing side 246 that is also curved, wherein the inner facing side 244 is preferably smaller in height than the outer facing side 246. The height of such a design would decrease on both the upper side 248 and the lower side 250 of the center sealing ring 238 at a constant rate of decreasing height to provide the desired shape.

The truncated side-ways tear drop-shaped embodiment as shown in FIGS. 25-31 preferably has an ID of about 1.4 cm to about 5.7 cm and an OD of about 2.5 cm to about 7 cm. The height $h_4$ of the seal at its OD is measured as the largest dimension between the highest and lowest points on the exterior portion on each of the upper and lower surfaces 248, 250, respectively, is about 0.45 cm to about 0.51 cm. At the ID, the height $h_5$ as measured along the highest and lowest points on the interior portion of the sealing ring measures about 0.31 cm to about 0.36 cm. The size and angled configuration may be varied within the truncated sideways teardrop embodiment with rounded sides to accommodate varying projection and ring designs within the scope of the invention.

As shown in FIGS. 32-38, a further embodiment of an assembly 300 is provided having an outer ring 312 and an inner ring 324 which are also essentially the same as the outer and inner rings 12, 24 of assembly 10, with the understanding that with a variation in center sealing ring configuration, one may adjust the outer and inner ring dimensions if desired. As shown in FIGS. 33-37, the assembly 300 has a center sealing ring 338 having a truncated side-ways tear drop shape with an inner facing side 344 that is generally flat and an outer facing side that is flat, by that incorporates beveled edges 352 on an exterior portion of the sealing ring as shown. The interior portion may also be beveled, slightly rounded or flat-edged. The inner facing side 344 is preferably smaller than the outer facing side 346.

The center sealing ring 338 having the truncated sideways tear drop-shaped with flat sides 344, 346 shown in FIGS. 33-38 in embodiment 300 as shown preferably has an ID of about 1.5 cm to about 5.8 cm and an OD of about 2.5 cm to about 6.9 cm. The height $h_6$ of the seal at its OD is measured as the largest dimension between the highest and lowest points on the exterior portion on each of the upper and lower surfaces 348, 350, respectively, which is about 0.45 cm to about 0.51 cm. At the ID, the height $h_7$ as measured along the highest and lowest points on the interior portion of the sealing ring and measures about 0.28 cm to about 0.33 cm. The size and angled configuration may be varied within the truncated sideways tear drop embodiment with flat sides to accommodate varying projection and ring designs within the scope of the invention.

In yet a further embodiment 400 herein, the invention includes a sealing assembly for a high temperature application having an outer ring 412 having an interior surface having two inwardly extending projections 416 defining a seal receiving area 418. The outer ring is essentially the same as that of embodiment 10. The assembly 400 includes a modified inner ring 454 having an exterior surface 456 and an interior surface 458. The exterior surface 456 has an outwardly extending rectangular portion 460 on a central portion along a central transverse axis $A_{IR}$ and on the exterior surface of the inner ring. A further rounded projection 462 is positioned so as to be extending outwardly from the rectangular portion 460.

Figure 40:
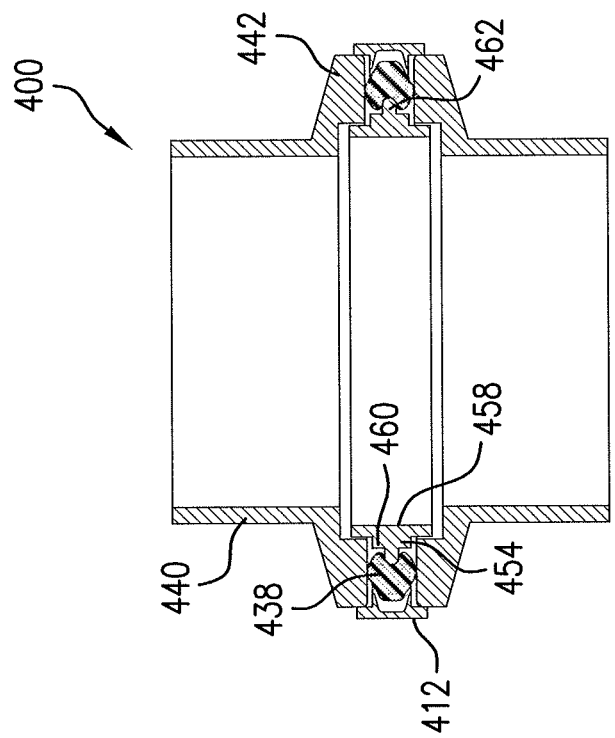
FIG. 40 is a longitudinal cross-sectional view of the sealing assembly of FIG. 39 taken along line 40-40.
Figure 39:
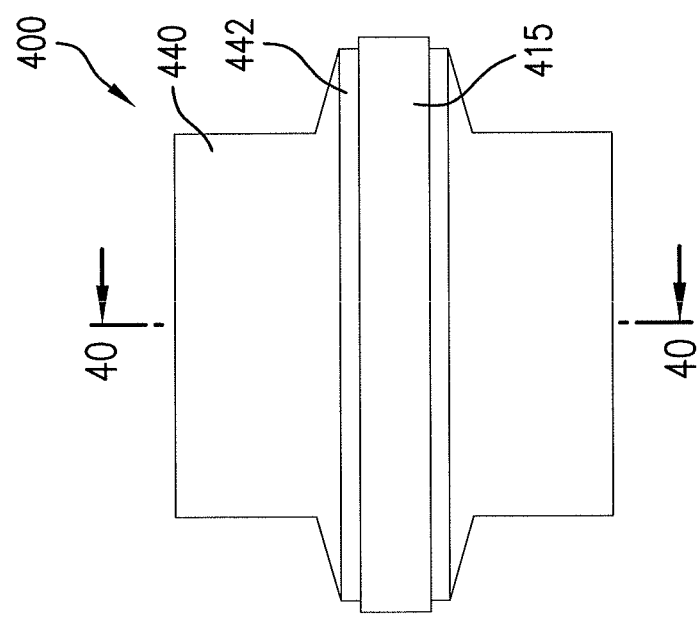
FIG. 39 is a side elevational view of a further embodiment of a sealing assembly herein in which the center sealing ring is inwardly facing and generally C-shaped.
Figure 57:
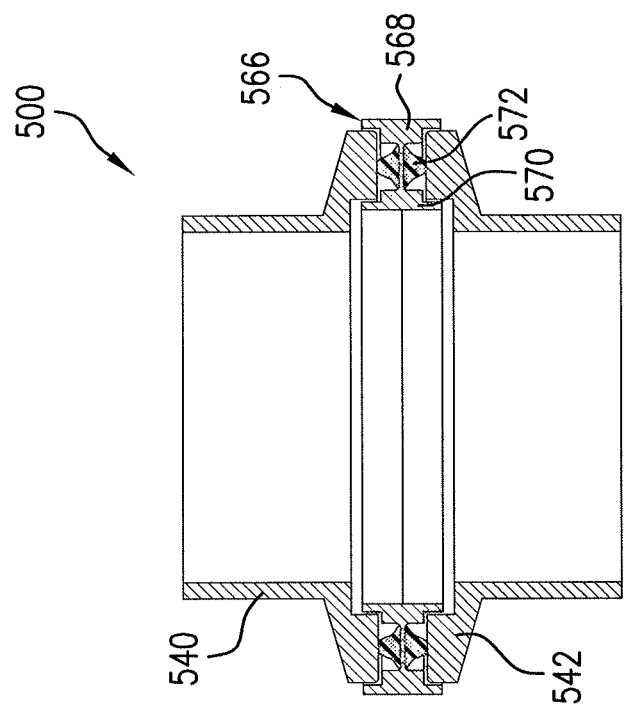
FIG. 57 is a longitudinal cross-sectional view of the bonded sealing assembly of FIG. 56 taken along line 57-57.
Figure 56:
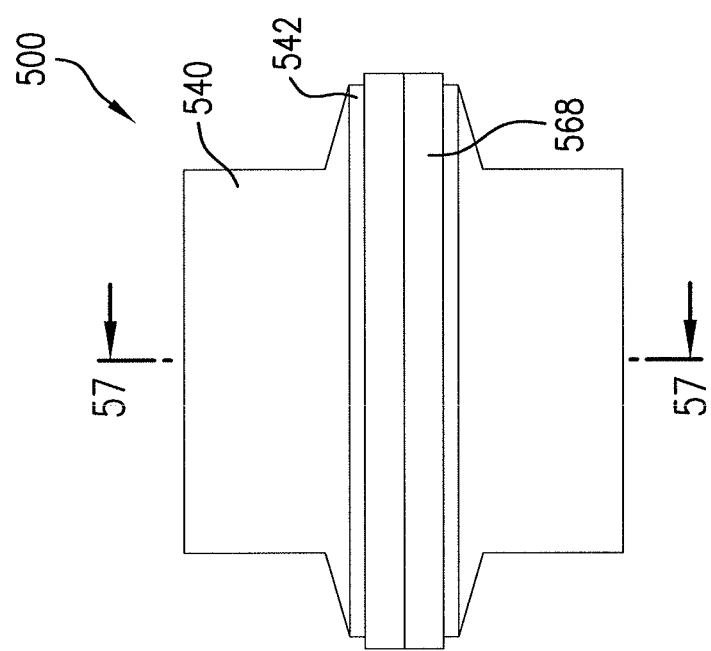
FIG. 56 is a side elevational view of a bonded sealing assembly.

The center sealing ring 438 has a longitudinal cross-section as shown best in FIGS. 40 and 51-54 that is an inwardly facing and generally "C"-shaped profile. The "C"-shaped center sealing ring 438 defines an inner ring receiving area 464. The center sealing ring 438 is configured to be positioned within the seal receiving area 418 of the outer ring 412 and to receive the outwardly extending rounded projection 462 of the inner ring 454 within the inner ring receiving area 464 as best shown in FIG. 40. When the sealing assembly 400 is installed in a high temperature application, the elastomeric center sealing ring 438 is enclosed within the outer ring 412 and compressed against the inner ring 454 so as to protect the center sealing ring 438 while allowing for thermal expansion of the center sealing ring 438.

The seal receiving area 418 of the outer ring 412 in this embodiment preferably has a longitudinal cross-sectional profile of an inwardly facing truncated "V" as with the outer ring 12 of embodiment 10. The inwardly facing projections 416a, 416b of the outer ring 412 may each be spaced from each other and each spaced from a longitudinal center along the transverse center axis $A_{OR}$ of the interior surface 414 of the outer ring 412 by a distance of about 50% to about 60% of a height $H_{OR}'$ of the interior surface of the outer ring 412. Each inwardly facing projection 416 of the outer ring 412 may be angled away from a transverse central axis $A_{OR}$ through the outer ring and from each other, and each preferably like embodiment 10 also forms an angle of about 5° to about 25° with the transverse central axis of the outer ring, and more preferably about 10° to about 20° with the transverse central axis of the outer ring.

The outer ring and/or the inner ring in this embodiment may be formed of the same materials used for embodiments 10, 100, 200 and 300.

With respect to FIGS. 56-62, in yet a further embodiment 500 herein, the invention includes a bonded sealing assembly 500 for high temperature applications. This embodiment provides a sealing ring body 566 having a longitudinal cross-section having an outer ring portion 568, an inner ring portion 570 and a central transversely extending bridge 572 that extends between the outer and the inner ring portions 568, 570. The outer ring portion 568 has an inwardly extending rectangular portion 574 and the inner ring portion has an inwardly extending rectangular portion 576. Each of the rectangular portions 574, 576 of the outer ring portion and the inner ring portion 576 are positioned so as to be longitudinally centered with respect to a central transverse axis $A_{SRB}$ through the sealing ring body. The bridge 572 has an upper surface 578 and a lower surface 580. The outer and inner ring portions 568, 570 together with and the bridge 572 further define an upper seal receiving area 582 and a lower seal receiving area 584.

The embodiment further includes an upper seal lobe portion 586 and a lower seal lobe portion 588, each seal portion, 586, 588 is bonded respectively to the upper surface 578 and the lower surface 580 of the bridge 572. Each lobe portion 586, 588 is thus respectively located within each of the respective seal receiving areas 582, 584 of the sealing ring body 566. The upper and the lower seal lobe portions 586, 588 each have respectively an upwardly extending and a downwardly extending generally parabolic longitudinal cross-section as best shown in FIGS. 59, 60 and 61. As the sealing material approaches the bottom edges of the parabolic profile, troughs T form on the upper and lower portions for compression and expansion of the ring. The sealing material (see FIG. 60) preferably extends along the interior of the sealing body 566 along the perimeter of the seal receiving areas 582, 584.

In this embodiment, the sealing ring body 566 may be formed of any of the metals, metal alloys and/or a fluoropolymers noted above with respect to prior embodiments. The upper and lower seal lobe portions preferably comprise elastomers.

The sealing ring body and the seal lobe portions may be chemically or mechanically bonded. In mechanically bonding the seal, small openings may be formed in the sealing ring body on the surfaces facing the seal receiving areas and upon molding and curing, the elastomeric material will vulcanize and expand to mechanically lock the sealing lobes into place. In chemically bonding, any chemical bonding agent known or to be developed in the art may be used that is compatible with the materials used to form the sealing lobes (which may be a variety of elastomers noted elsewhere herein) to the material used to form the sealing ring body.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A sealing assembly for a high temperature application, comprising:
    an outer ring having an interior surface having two inwardly extending projections defining a seal receiving area;
    an inner ring having an exterior surface having two outwardly extending projections defining a seal receiving area;
    a center sealing ring comprising an elastomer and configured to be positioned within the seal receiving areas of the outer ring and the inner ring, wherein when the sealing assembly is installed in a high temperature application including a service temperature of about 100° C. to about 300° C., the elastomeric center sealing ring is enclosed within the outer and the inner rings so as to protect the center sealing ring while allowing for thermal expansion of the center sealing ring, wherein the seal receiving area of the outer ring has a longitudinal cross-sectional profile of an inwardly facing truncated V and, wherein each inwardly facing projection of the outer ring is angled away from a transverse central axis through the outer ring and from each other, and each forms an angle of about 5° to about 25° with the transverse central axis of the outer ring.

2. The sealing assembly according to claim 1, wherein the high temperature application is a vacuum sealing assembly for use in semiconductor manufacturing.

3. The sealing assembly according to claim 1, wherein the high temperature application includes a service temperature of about 180° C. to about 300° C.

4. The sealing assembly according to claim 1, wherein the elastomer is a fluoroelastomer or a perfluoroelastomer.

5. The sealing assembly according to claim 1, Wherein each inwardly facing projection of the outer ring forms an angle of about 10° to about 20° with the transverse central axis of the outer ring.

6. The sealing assembly according to claim 1, wherein the outwardly facing projections of the inner ring are each spaced from each other and are each spaced from a longitudinal center of the exterior surface of the inner ring by a distance of about 43% to about 53% of a height of the exterior surface of the inner ring.

7. The sealing assembly according to claim 1, wherein the seal receiving area of the inner ring has a longitudinal cross-sectional profile of an outwardly facing truncated V.

8. The sealing assembly according to claim 7, wherein the inwardly facing projections of the outer ring are each spaced from each other and are each spaced from a longitudinal center of the interior surface of the outer ring by a distance of about 50% to about 60% of a height of the interior surface of the outer ring, and wherein the outwardly facing projections of the inner ring are each spaced from each other and are each spaced from a longitudinal center of the exterior surface of the inner ring by a distance of about 43% to about 53% of a height of the exterior surface of the inner ring.

9. The sealing assembly according to claim 1, wherein the center sealing ring has a longitudinal cross-section that has a side-ways barrel shape.

10. The sealing assembly according to claim 1, wherein the center sealing ring has a longitudinal cross-section that has a truncated side-ways tear drop shape with an inner facing side that is flat and an outer facing side that is curved, wherein the inner facing side is smaller than the outer facing side.

11. The sealing assembly according to claim 1, wherein the center sealing ring has a longitudinal cross-section that has a truncated side-ways tear drop shape with an inner facing side that is curved and an outer facing side that is curved, and wherein the inner facing side is smaller than the outer facing side.

12. The sealing assembly according to claim 1, wherein the center sealing ring has a longitudinal cross-section that has a truncated side-ways tear drop shape with an inner facing side that is flat and an outer facing side that is flat, and wherein the inner facing side is smaller than the outer facing side.

13. A sealing assembly for a high temperature application, comprising:
    an outer ring having an interior surface having two inwardly extending projections defining a seal receiving area;
    an inner ring having an exterior surface having two outwardly extending projections defining a seal receiving area;
    a center sealing ring comprising an elastomer and configured to be positioned within the seal receiving areas of the outer ring and the inner ring, wherein when the sealing assembly is installed in a high temperature application including a service temperature of about 100° C. to about 300° C., the elastomeric center sealing ring is enclosed within the outer and the inner rings so as to protect the center sealing ring while allowing for thermal expansion of the center sealing ring, wherein the seal receiving area of the inner ring has a longitudinal cross-sectional profile of an outwardly facing truncated V and, wherein each outwardly facing projection of the inner ring is angled away from a transverse central axis through the inner ring and from each other, and each forms an angle of about 5° to about 25° with the transverse central axis of the inner ring.

14. The sealing assembly according to claim 13, wherein the seal receiving area of the outer ring has a longitudinal cross-sectional profile of an inwardly facing truncated V.

15. The sealing assembly according to claim 14, wherein the inwardly facing projections of the outer ring are each spaced from each other and are each spaced from a longitudinal center of the interior surface of the outer ring by a distance of about 50% to about 60% of a height of the interior surface of the outer ring.

16. The sealing assembly according to claim 13, wherein each outwardly facing projection of the inner ring forms an angle of about 10° to about 20° with the transverse central axis of the inner ring.

17. The sealing assembly according to claim 13, wherein the high temperature application is a vacuum sealing assembly for use in semiconductor manufacturing.

18. The sealing assembly according to claim 13, wherein the high temperature application includes a service temperature of about 180° C. to about 300° C.

19. The sealing assembly according to claim 13, wherein the elastomer is a fluoroelastomer or a perfluoroelastomer.

20. The sealing assembly according to claim 13, wherein the center sealing ring has a longitudinal cross-section that has a side-ways barrel shape.

21. The sealing assembly according to claim 13, wherein the center sealing ring has a longitudinal cross-section that has a truncated side-ways tear drop shape with an inner facing side that is flat and an outer facing side that is curved, wherein the inner facing side is smaller than the outer facing side.

22. The sealing assembly according to claim 13, wherein the center sealing ring has a longitudinal cross-section that has a truncated side-ways tear drop shape with an inner facing side that is curved and an outer facing side that is curved, and wherein the inner facing side is smaller than the outer facing side.

23. The sealing assembly according to claim 13, wherein the center sealing ring has a longitudinal cross-section that has a truncated side-ways tear drop shape with an inner facing side that is flat and an outer facing side that is flat, and wherein the inner facing side is smaller than the outer facing side.

24. A sealing assembly for a high temperature application, comprising:
    an outer ring having an interior surface having two inwardly extending projections defining a seal receiving area;
    an inner ring having an exterior surface having two outwardly extending projections defining a seal receiving area;
    a center sealing ring comprising an elastomer and configured to be positioned within the seal receiving areas of the outer ring and the inner ring, wherein when the sealing assembly is installed in a high temperature application including a service temperature of about 100° C. to about 300° C., the elastomeric center sealing ring is enclosed within the outer and the inner rings so as to protect the center sealing ring while allowing for thermal expansion of the center sealing ring, wherein the seal receiving area of the outer ring has a longitudinal cross-sectional profile of an inwardly facing truncated V and the seal receiving area of the inner ring has a longitudinal cross-sectional profile of an outwardly facing truncated V and, wherein each inwardly extending projection of the outer ring is angled away from a transverse central axis through the outer ring and from each other, and each forms an angle of about 5° to about 25° with the transverse central axis of the outer ring, and wherein each outwardly extending projection of the inner ring is angled away from a transverse central axis through the inner ring and from each other, and each forms an angle of about 5° to about 25° with the transverse central axis of the inner ring.

25. A sealing assembly for a high temperature application, comprising:
    an outer ring having an interior surface having two inwardly extending projections defining a seal receiving area;
    an inner ring having an exterior surface having an outwardly extending rectangular portion on a central portion of the exterior surface of the inner ring and a further rounded projection extending outwardly from the rectangular portion;
    a center sealing ring having a longitudinal cross-section that is inwardly facing and generally C-shaped to define an inner ring receiving area, wherein the center sealing ring is configured to be positioned within the seal receiving area of the outer ring and to receive the outwardly extending rounded projection of the inner ring within the inner ring receiving area, and wherein when the sealing assembly is installed in a high temperature application, the elastomeric center sealing ring is enclosed within the outer ring and compressed against the inner ring so as to protect the center sealing ring while allowing for thermal expansion of the center sealing ring.

26. The sealing assembly according to claim 25, wherein the seal receiving area of the outer ring has a longitudinal cross-sectional profile of an inwardly facing truncated V.

27. The sealing assembly according to claim 26, wherein the inwardly facing projections of the outer ring are each spaced from each other and are each spaced from a longitudinal center of the interior surface of the outer ring by a distance of about 50% to about 60% of a height of the interior surface of the outer ring.

28. The sealing assembly according to claim 26, wherein each inwardly facing projection of the outer ring is angled away from a transverse central axis through the outer ring and from each other, and each forms an angle of about 5° to about 25° with the transverse central axis of the outer ring.

29. The sealing assembly according to claim 28, wherein the inwardly facing projections of the outer ring each form an angle of about 10° to about 20° with the transverse central axis of the outer ring.

30. The sealing assembly of claim 25, wherein the outer ring and the inner ring comprise a metal, a metal alloy or a fluoropolymer.

31. The sealing assembly of claim 30, wherein the outer ring and/or the inner ring comprises a metal or metal alloy selected from the group consisting of aluminum 6061, aluminum 7075, stainless steel 316, and stainless steel 304.

32. The sealing assembly according to claim 30, wherein the outer ring and/or the inner ring comprises a fluoropolymer that is selected from polytetrafluoroethylene, a copolymer of perfluoroalkylvinyl ether and tetrafluoroethylene, and a copolymer of hexafluoropropylene and tetrafluoroethylene.

33. The sealing assembly of claim 25, wherein the center sea ling ring comprises a fluoroelastomer or a perfluoroelastomer.

34. A bonded sealing assembly for a high temperature application, comprising:

a sealing ring body having a longitudinal cross-section that has an outer ring portion, an inner ring portion and a central transversely extending bridge extending between the outer and the inner ring portions, wherein the outer ring portion has an inwardly extending rectangular portion and the inner ring portion has an inwardly extending rectangular portion, each of the rectangular portions of the inner ring portion and the outer ring portions being positioned so as to be longitudinally centered with respect to a central transverse axis through the sealing ring body, wherein the bridge has an upper surface and a lower surface, and wherein the outer and inner ring portions together with and the bridge define upper and lower seal receiving areas; and an upper seal lobe portion and a lower seal lobe portion, each bonded respectively to the upper surface and the lower surface of the bridge and each respectively located within the seal receiving areas of the sealing ring body, wherein the upper and the lower seal lobe portions have respectively an upwardly extending and a downwardly extending generally parabolic longitudinal cross-section, and wherein the upper and lower seal lobe portions define troughs in the respective seal receiving areas that allow for expansion of each of the upper seal lobe portion and the lower seal lobe portion.

35. The bonded sealing assembly according to claim 34, wherein the sealing ring body comprises a metal, a metal alloy and/or a fluoropolymer; the upper and lower seal lobe portions comprise an elastomer; and the sealing ring body and the seal lobe portions are chemically bonded.

36. The bonded sealing assembly according to claim 35, wherein the sealing ring body is a metal or metal alloy selected from the group consisting of aluminum 6061, aluminum 7075, stainless steel 316, and stainless steel 304.

37. The bonded sealing assembly according to claim 35, wherein the sealing ring body is a fluoropolymer selected from polytetrafluoroethylene, a copolymer of perfluoroalkylvinyl ether and tetrafluoroethylene, and a copolymer of hexafluoropropylene and tetrafluoroethylene.

38. The bonded sealing assembly according to claim 34, wherein the elastomer is a perfluoroelastomer or a fluoroelastomer.

39. The bonded sealing assembly according to claim 34, wherein the sealing ring body and the seal lobe portions are mechanically bonded.

40. The bonded sealing assembly for a high temperature application according to claim 34, wherein the troughs in the respective seal receiving areas allow for expansion of each of the upper seal lobe portion and the lower seal lobe portion when the sealing assembly is installed in a high temperature application including a service temperature of about 100° C. to about 300° C.

* * * * *